(12) United States Patent
Adkins et al.

(10) Patent No.: US 6,823,133 B1
(45) Date of Patent: Nov. 23, 2004

(54) APPARATUS AND METHOD FOR ELECTRONIC CONTROL OF DC MOTOR USING AN ALL-DIGITAL PHASE-LOCKED LOOP

(75) Inventors: Christopher Alan Adkins, Lexington, KY (US); Thomas Jon Eade, Lexington, KY (US); Michael Anthony Marra, III, Lexington, KY (US); Bruce Lanier Walcott, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 09/440,795

(22) Filed: Nov. 15, 1999

(51) Int. Cl.$^7$ ............................................... H03D 13/00
(52) U.S. Cl. ...................................... 388/814; 388/805
(58) Field of Search .................................. 385/800–815; 347/5, 20; 400/299, 320, 322; 318/696, 138, 253, 254, 439; 388/805, 812, 813, 814, 820, 832, 800

(56) References Cited

U.S. PATENT DOCUMENTS

| | | | |
|---|---|---|---|
| 4,464,770 A | | 8/1984 | Maurer et al. |
| 4,513,429 A | | 4/1985 | Roeder |
| 4,549,123 A | * | 10/1985 | Hagglund et al. .......... 318/610 |
| 4,627,079 A | | 12/1986 | von der Embse |
| 4,637,307 A | * | 1/1987 | Miller ...................... 101/93.04 |
| 4,639,649 A | * | 1/1987 | Seto ........................... 388/813 |
| 4,652,159 A | * | 3/1987 | Nagai ......................... 400/322 |
| 4,697,519 A | | 10/1987 | Rice, Jr. et al. |
| 4,706,263 A | | 11/1987 | von der Embse |
| 4,712,223 A | | 12/1987 | Nelson |
| 4,754,391 A | * | 6/1988 | Suzuki ........................ 700/37 |
| 4,816,722 A | | 3/1989 | Shigemori |
| 4,820,993 A | | 4/1989 | Cohen et al. |
| 4,821,293 A | | 4/1989 | Shimizume et al. |
| 5,005,016 A | | 4/1991 | Schmidt et al. |
| 5,034,083 A | | 7/1991 | Campanelli et al. |
| 5,109,394 A | | 4/1992 | Hjerpe et al. |
| 5,161,009 A | * | 11/1992 | Tanoi et al. ................ 349/150 |
| 5,184,093 A | | 2/1993 | Itoh et al. |
| 5,212,434 A | * | 5/1993 | Hsieh ......................... 318/603 |
| 5,221,397 A | | 6/1993 | Nystrom |
| 5,258,933 A | | 11/1993 | Johnson et al. |
| 5,283,729 A | * | 2/1994 | Lloyd ......................... 364/157 |
| 5,295,079 A | | 3/1994 | Wong et al. |
| 5,299,237 A | | 3/1994 | Head |
| 5,347,234 A | | 9/1994 | Gersbach et al. |

(List continued on next page.)

OTHER PUBLICATIONS

Rocha, L. F., "Simulation of a Discrete PLL with Variable Parameters," Proceedings of the IEEE, vol. 67 ( No. 3), p. 440–442, ( Mar. 1979).
Byrne, C.J., "Properties and Design of the Phase–Controlled Oscillator with a Sawtooth Comparator," The Bell System Technical Journal, p. 559–602, ( Mar. 1962).
Gupta, S. C., "Phase–Locked Loops," Proceedings of the IEEE, vol. 63 ( No. 2), p. 291–306, ( Feb. 1975).

(List continued on next page.)

*Primary Examiner*—David Martin
*Assistant Examiner*—Patrick Miller
(74) *Attorney, Agent, or Firm*—Michael T. Sanderson; King & Schickli, PLLC

(57) ABSTRACT

A control system in the form of an all-digital phase-locked loop controls movement of a DC motor. The control system includes a movement detector in the form of an optical encoder to detect movement of a DC motor. A digital phase detector compares output of a feedback signal from the movement detector and a reference signal. The digital phase detector is phase frequency detector that follows a describing function to model non-linear components of the reference signal. A digital loop filter then filters noise from the comparison signal and the filtered signal is amplified to control the DC motor. The phase frequency detector includes a state machine to track a time varying reference signal and selectively output a response to provide for system damping.

30 Claims, 19 Drawing Sheets

U.S. PATENT DOCUMENTS

| | | | |
|---|---|---|---|
| 5,351,275 A | | 9/1994 | Wong et al. |
| 5,359,631 A | | 10/1994 | Behrens et al. |
| 5,371,425 A | * | 12/1994 | Rogers .......................... 327/3 |
| 5,373,255 A | | 12/1994 | Bray et al. |
| 5,400,364 A | | 3/1995 | Yada |
| 5,450,452 A | | 9/1995 | Kakuishi et al. |
| 5,452,326 A | * | 9/1995 | Tanaka ....................... 375/376 |
| 5,477,177 A | | 12/1995 | Wong et al. |
| 5,502,711 A | | 3/1996 | Clark et al. |
| 5,543,754 A | | 8/1996 | Onodera |
| 5,572,099 A | * | 11/1996 | Carobolante ................ 318/434 |
| 5,572,157 A | | 11/1996 | Takashi et al. |
| 5,572,167 A | | 11/1996 | Alder et al. |
| 5,602,883 A | | 2/1997 | Stephens et al. |
| 5,619,543 A | | 4/1997 | Glass |
| 5,652,773 A | | 7/1997 | Lu |
| 5,692,014 A | | 11/1997 | Basham et al. |
| 5,727,038 A | | 3/1998 | May et al. |
| 5,790,614 A | * | 8/1998 | Powell ....................... 375/376 |
| 5,790,971 A | * | 8/1998 | Hsieh .......................... 701/99 |
| 5,803,628 A | * | 9/1998 | Donahue .................... 400/279 |
| 5,811,998 A | * | 9/1998 | Lundberg et al. ........... 327/156 |
| 5,818,272 A | * | 10/1998 | Williams .................... 327/156 |
| 5,873,663 A | * | 2/1999 | Yokoi et al. ................. 400/279 |
| 5,978,425 A | * | 11/1999 | Takla .......................... 375/374 |
| 6,121,747 A | * | 9/2000 | Trachtenberg .............. 318/800 |
| 6,128,541 A | * | 10/2000 | Junk ............................ 700/39 |
| 6,147,561 A | * | 11/2000 | Rhee et al. .................... 331/12 |
| 6,181,098 B1 | * | 1/2001 | Murakami .................. 318/603 |
| 6,366,174 B1 | * | 4/2002 | Berry et al. .................. 331/78 |
| 6,438,431 B1 | * | 8/2002 | Wang et al. .................. 700/39 |
| 6,471,319 B1 | * | 10/2002 | Adkins et al. ................ 347/11 |
| 6,609,781 B2 | * | 8/2003 | Adkins et al. ................ 347/37 |
| 6,707,408 B2 | * | 3/2004 | Guedon et al. ............. 341/143 |
| 2002/0126165 A1 | * | 9/2002 | Adkins et al. ................ 347/9 |

OTHER PUBLICATIONS

Muira, Goro and Akio Takano, "Phase–Locked Loop Speed Control of Motors by PID Feedback of Phase Difference," Electrical Engineering in Japan, vol. 107 ( No. 4), p. 104–111, (May 1987).

Abdel–Azim, Sanaa and Jim Dreiling, "Digital Control of a Brushless DC Motor," IEEE Control Systems Magazine, p. 31–35, (Oct. 1987).

Gupta, S. C. , "On Optimum Digital Phase–Locked Loops," IEEE Transactions on Communication Technology, vol. COM ( No. 16), p. 340–344, ( Apr. 968).

Yamamoto, H. and S. Mori, "Performance of a Binary Quantized All Digital Phase–Locked Loop with a New Class of Sequential Filter," IEEE Transactions On Communications, vol. COM–26 ( No. 1), p. 35–45, ( Jan. 1978).

Lindsey, William C. and Chak Ming Chie, "A Survey of Digital Phase–Locked Loops," Proceedings of the IEEE, vol. 69 ( No. 4), p. 410–431, ( Apr. 1981).

Labinger, R. L., "Designing Phase Locked Loop Servos With Digital ICs," Control Engineering, p. 46–48, (Feb. 1973).

Smithgall, David H., "A Phase–Locked Loop Motor Control System," IEEE Transactions on Industrial Electronics and Control Instrumentation, vol. IEC–22 (No. 4), p. 487–490, ( Nov. 1975).

Prasad, E. S. N., G. K.Dubey, and Srinivasa S. Prabhu, "High–Performance DC Motor Drive with Phase–Locked Loop Regulation," IEEE Transactions on Industry Applications, vol. IA–21 ( No. 1), p. 192–201, (Jan./Feb. 1985).

Moore, A.W., "Phase–Locked Loops for Motor–Speed Control ," IEEE Spectrum, p. 61–67, ( Apr. 1973).

Westlake, P.R., "Digital Phase Control Techniques," IRE Transactions on Communications Systems, vol. CS ( No. 8), p. 237–246, ( Dec. 1960).

Harashima, F., H. Naitoh, M. Koyama and S. Kondo, "Performance Improvement in Microprocessor–Based Digital PLL Speed Control System," IEEE Transactions on Industrial Electronics and Control Instrumentation, vol. IECI–28 (No. 1), p. 56–61, (Feb. 1981).

Larimore, W.E., "Synthesis of Digital Phase–Locked Loops," 1968 EASCON, p. 14–20, ( Oct. 1968).

Garodnick, J., J. Greco and D. L. Schilling, "Response of an All Digital Phase–Locked Loop," IEEE Transactions on Communications, vol. COM–22 (No. 6), p. 751–763, ( Jun. 1974).

Gill, G.S. and S. C. Gupta, First–Order Discrete Phase–Locked Loop With Applications To Demodulation Of Angle–Modulated Carrier, IEEE Transactions on Communications, p. 454–462, ( Jun. 1972).

Weinberg, A. and B. Liu, "Discrete Time Analyses Of Nonuniform Sampling First– And Second–Order Digital Phase–Locked Loops," IEEE Transactions on Communications, vol. COM–22 (No. 2), p. 123–137, ( Feb. 1974).

Koizumi, T. and H. Miyakawa, "Statistical Analyses of Digital Phase–Locked Loops with Time Delay," IEEE Transactions on Commnuications, vol. COM ( No. 25), p. 731–735, (Jul. 1977).

Chie, C.M., "Mathematical Analogies Between First–Order Digital and Analog Phase–Locked Loops," IEEE Transactions on Communications, vol. COM–26 (No. 6) p. 860–865, (Jun. 1978).

Lindsey, W. C. and C. M. Chie,"Acquisition Behavior of a First–Order Digital Phase–Locked Loop," IEEE Transactions on Communications, vol. COM–26 (No. 9), p. 1364–1370, ( Sep. 1978).

D'Andrea, N. A. and F. Russo, "A Binary Quantized Digital Phase Locked Loop: A Graphical Analysis" IEEE Transactions on Communications, vol. COM–26 (No. 9), p. 1355–1364, ( Sep. 1978).

Lin, H. Y., M. C. Lu, J. H. Horng, T. B. Yang, S. C. Hsieh, C. Y., Hsiao, H. M. Tai and J. S. Chen, "DC Servo Speed Control of an Inkjet Print Head Transport System Using a Phase–Locked Loop," Proceedings of the 1996 4th Int'l Workshop on Advanced Motion Control, p. 458–463, ( Mar. 1996).

Nash, G., "Phase–Locked Loop Design Fundamentals," AN535 Application Note, Motorola, Inc., p. 1–13, ( Oct. 1994).

* cited by examiner

PFD STATE TRANSITION TABLE

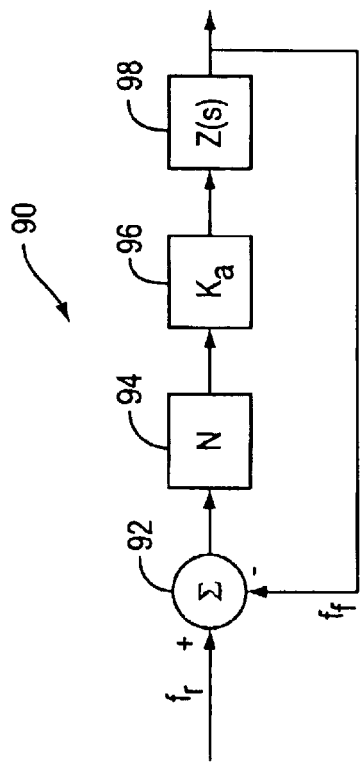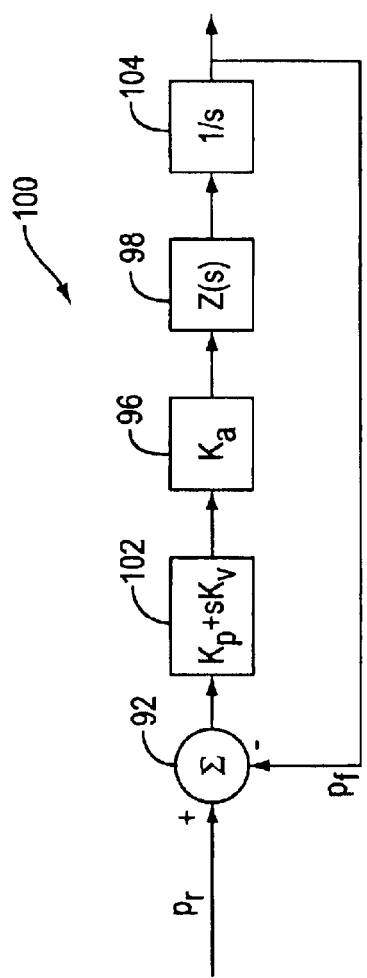
FIG. 13
FIG. 14

| CAPACITOR VOLTAGES | PFD "UP" | PFD "DOWN" | PFD "OFF" Vc124>Vc126 | PFD "ON" Vc124<Vc126 |
|---|---|---|---|---|
| Vc124 | INCREASES | DECREASES | DECREASES | INCREASES |
| Vc126 | INCREASES | DECREASES | INCREASES | DECREASES |

OPERATION OF ANALOG LOOP FILTER

FIG. 22

| PRINT SPEED (ips) | PRELOAD ACCUMULATOR 1 | PRELOAD ACCUMULATOR 2 | FREQUENCY (Hz) ACCUMULATOR 1 | FREQUENCY (Hz) ACCUMULATOR 2 |
|---|---|---|---|---|
| 8 | 500 | 290 | 50,000 | 100 |
| 16 | 800 | 300 | 50,000 | 100 |
| 20 | 900 | 350 | 50,000 | 100 |
| 40 | 900 | 650 | 50,000 | 100 |

DESIGN PARAMETERS OF ADPLL FOR VARIOUS PRINT SPEEDS

FIG. 25

| $u_r$-$u_f$ 0-0 | $u_r$-$u_f$ 0-1 | $u_r$-$u_f$ 1-1 | $u_r$-$u_f$ 1-0 | UP | DOWN |
|---|---|---|---|---|---|
| (1) | 2 | 2 | (1) | 1 | 1 |
| 4 | (2) | (2) | 7 | 1 | 1 |
| 4 | (3) | 2 | 7 | 0 | 1 |
| (4) | 5 | 6 | 7 | 1 | 1 |
| 8 | (5) | 6 | 9 | 1 | 1 |
| 4 | 3 | (6) | 9 | 1 | 1 |
| 1 | 3 | 6 | (7) | 1 | 1 |
| (8) | 10 | 10 | (8) | 1 | 1 |
| 4 | 5 | 10 | (9) | 1 | 0 |
| 4 | 5 | (10) | (10) | 1 | 1 |

PFD STATE TRANSITION TABLE

FIG. 27

APPARATUS AND METHOD FOR ELECTRONIC CONTROL OF DC MOTOR USING AN ALL-DIGITAL PHASE-LOCKED LOOP

BACKGROUND OF THE INVENTION

The present invention relates to the art of control systems for electrical motors. More particularly, the present invention relates to the art of control systems for DC motors using all-digital phase-locked loops.

Control systems for electrical motors have historically been analog devices because the electrical motor itself is an analog device. However, with the increased use of digital circuitry to control a variety of applications, electrical motor control is also evolving toward digital control. Electrical motors, and in particular DC servo motors, find a variety of applications from use in computer disk drives, to use in robotic machinery and mechanical printing devices.

Color inkjet printers are one form of mechanical printing devices that have recently emerged as the leader in the desktop and small business market. Today, color inkjets can provide near laser quality printing at a fraction of the cost of laser printers. In the art of black-and-white printing, and in the applications of non-networked desktop offices and home use computers, inkjet printers are finding wide acceptance over low-end laser printers. This has created a large demand in the inkjet printer market for low-cost, high quality printers.

With this increase in demand and competition, important factors include improved quality and lower cost. In inkjet printers, a microprocessor typically controls the printing process. All of the digital circuitry needed to support the microprocessor is placed into an Application Specific Integrated Circuit ("ASIC"). Advances in both microprocessor and integrated circuit technology have been major areas of cost reduction in the past. By replacing the processing burden of the microprocessor with digital circuitry in the ASIC, microprocessor bandwidth may be reduced, thereby facilitating the use of less expensive microprocessors or even the eventual removal of the microprocessor.

Inkjet printers produce output by spraying drops of ink onto a page. Some ink-jet printers, instead of projecting the ink electrostatically or with very tiny pumps, vaporize the ink within a heated capillary. The pressure of expanding gas then jets the expanding vapor onto the page. The inkjet heads, which are used to deposit the ink onto the paper, are attached to a carriage, which houses the ink reservoirs. In the printing process, this carriage must be moved across the page at a constant rate in order to deposit the ink onto the paper in a uniform manner. The carriage is traditionally belt driven by a DC servo motor.

Conventionally, the velocity of the carriage is controlled by a microprocessor. The load of the carriage changes with position, and the mass of the ink left in the reservoir changes with time, thus making the system time-varying. The DC servo motor with belt drive connection to the carriage is a highly non-linear system. Precise velocity control of the non-linear time-varying carriage system will require a control scheme with a fairly high sample rate. Thus, implementing this scheme of precise velocity control in a microprocessor traditionally demands a majority of the microprocessor bandwidth during print moves.

In the last 20 years, with the reduction in cost of digital systems, the use of phase-locked loop ("PLL") motor control systems has increased. Although PLL systems were originally designed for applications involving synchronization of signals in communication systems, A. W. Moore showed in "Phase-Locked Loops for Motor-Speed Control," IEEE Spectrum. April 1973, p. 61–67, that PLL systems can be applied to motor speed control. In fact, it has been shown that speed control with an accuracy approaching 0.002% is possible.

Originally, PLLs were designed and implemented exclusively in analog circuitry. In 1960, Westlake, set forth in "Digital Phase Control Techniques," IRE Transactions on Communications Systems v.CS-8, December 1960, p. 237–246, that a digital Voltage Controlled Oscillator ("VCO") could be incorporated into a PLL. Various developments continued in the 1960s in an effort to replace the analog PLL components with digital circuitry. In most work, however, the PLL system remained a hybrid mix of digital and analog components, called the Digital Phase-Locked Loop ("DPLL"). Accordingly, hereinbelow, the term "digital phase-locked loop" shall refer to a hybrid mix of digital and analog components. In 1967, Drogin, set forth in "Steering on Course to Safer Air Travel," Electron Nov. 27, 1967, p. 95–102, that an entire PLL could be implemented with digital components for use in a communication control system, and thereby created the first All-Digital Phase-Locked Loop ("ADPLL"). Thus, hereinbelow, the term "all-digital phase locked loop" shall refer to a PLL, which is implemented entirely with digital components.

All PLL motor control systems to date have hence been either all analog or DPLL configurations. Today, systems that were implemented with DPLLs conventionally retain an analog loop filter. This is convenient for most motor control systems because the input to the motor is a variable analog voltage. However, in order to easily realize a PLL control system in an application specific integrated circuit ("ASIC"), the loop filter is preferably a digital device. Analog loop filters are less precise and require analog components such as resistors and capacitors, which vary from vendor to vendor.

One form of digital phase-locked loop filter for use in motor control is set forth by Shigemori in U.S. Pat. No. 4,816,722. Shigemori uses a digital loop filter in the form of an up-down counter. The count from the up-down counter is clocked into an adder, and an overflow signal is then transmitted through a frequency divider to produce a feedback output signal. The digital loop filter in the form of an up-down counter suffers from the disadvantages of locking in a state when the phase error is zero.

BRIEF SUMMARY OF THE INVENTION

It is therefore an object of the present invention to present a solution to the above problems in the art and to present a novel all-digital phase-locked loop system to control the velocity of a DC motor, and in particular an inkjet print head transport system. The ADPLL system is preferably implemented in an ASIC using standard digital devices. The system preferably provides for printer steady-state error, overshoot, and settling time.

It is a further object of the present invention to provide an inkjet print head transport system that provides less than ±5% steady error and less than 20% overshoot. Also, the carrier preferably accelerates to the desired print speed at a rate of 0.8 g, where g is the acceleration due to gravity. A design routine is presented herein in accordance with the above.

It is a further object of the invention to provide velocity control of an inkjet print head by utilizing phase-locked loops, digital phase-locked loops, and all-digital phase-locked loops. The PLLs are used to control DC servo motors. Components of the PLLs preferably include a phase detector and a loop filter.

It is a further object of the present invention to provide a DPLL to control velocity of an inkjet print head carriage system. A mathematical model of the DPLL system is utilized to provide a non-linear analysis of a phase-frequency detector. Also, simulated results of a closed-loop system are given for various print speeds.

It is still a further object of the invention to provide a method for converting an analog loop filter into a digital loop filter for use in an all-digital phase-locked loop. Conversion of the analog loop filter provides for the implementation of the all-digital phase-locked loop in an application specific integrated circuit ("ASIC"). Conversion of the analog loop filter into a digital loop filter requires simulated and experimental results of a controller.

Objects of the present invention are achieved by a control system for controlling movement of a DC motor, including a movement detector to detect movement of a DC motor and output a corresponding feedback signal; a digital phase detector to compare phase of the feedback signal from the movement detector with phase of a reference signal and output a comparison signal, wherein the digital phase detector follows a describing function to model non-linear components of the reference signal; and a digital loop filter to filter noise from the comparison signal for control of the DC motor.

Further objects of the present invention are achieved by providing the digital phase detector and the digital loop filter within an application specific integrated circuit, and by using the phase frequency detector to model non-linear components of a reference signal.

Even further objects of the invention are achieved by a control system for controlling velocity of an inkjet print head in response to a reference signal, including a velocity detector to detect velocity of an inkjet print head and output a corresponding feedback signal; a digital phase frequency detector to compare phase of the feedback signal from the velocity detector with the reference signal and output a corresponding comparison signal; a digital loop filter to filter noise from the comparison signal; and a motor to control velocity of the inkjet print head in response to the filtered comparison signal.

Moreover, objects of the present invention are achieved by a method for controlling velocity of an inkjet print head in response to a reference signal, including the steps of: detecting a velocity of an inkjet print head and outputting a corresponding feedback signal; comparing phase of the feedback signal with phase of the reference signal using a digital phase frequency detector and outputting a corresponding comparison signal; filtering noise from the comparison signal; and controlling velocity of the inkjet print head in response to the filtered comparison signal.

Still further objects of the present invention are achieved by a control system for controlling velocity of an inkjet print head in a system including a velocity detector to detect inkjet print head velocity and output a corresponding feedback signal, a phase detector to compare phase of the feedback signal with phase of a reference signal and output a corresponding comparison signal, a digital loop filter to filter noise from the comparison signal, and a motor to control velocity of the inkjet print head in response to the filtered comparison signal, creation of the control system including: modeling the phase detector in a closed loop, phase locked loop configuration with a describing function; and dampening the frequency response of the describing function by anticipating a step response of the motor during initial movement.

BRIEF DESCRIPTION OF THE DRAWINGS

These and other objects and advantages of the present invention will become apparent and more readily appreciated from the following description of the preferred embodiments, taken in conjunction with the accompanying drawings of which:

FIG. 13 is a block diagram of a linearized frequency model system of a phase locked loop, without compensation in a locked mode.

FIG. 14 is a block diagram of a linearized phase model system of a phase locked loop, without compensation in a locked mode.

FIG. 22 is a table that illustrates the dynamic states of capacitor voltages corresponding to the outputs of the analog filter from FIG. 21.

FIG. 25 is a table that provides values of design parameters for all four print speeds illustrated in FIGS. 24A–24D.

FIG. 27 is a table showing a state transition table for the ADPLL of FIG. 23 having states optimized for system damping.

DETAILED DESCRIPTION OF THE PREFERRED EMBODIMENTS

Figure 1:
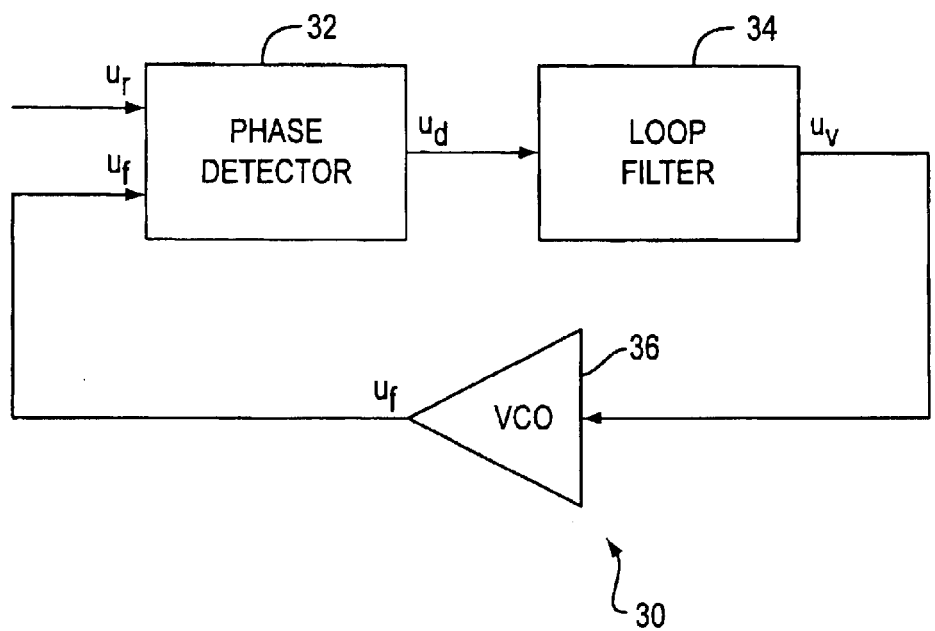
FIG. 1 is a block diagram of a general application, phase-locked loop according to an embodiment of the present invention.

Reference will now be made in detail to the preferred embodiments of the present invention, examples of which are illustrated in the accompanying drawings, wherein like reference numerals refer to like elements throughout.

Turning now to the figures, and in particular to FIG. 1, a general application phase-locked loop ("PLL") 30 is shown. PLL 30 synchronizes two signals, namely $u_r$ and $u_f$ in frequency as well as in phase. The PLL 30 operates on phase so that, if a phase error builds up between two signals, the control mechanism acts to minimize this error.

When the phase error between the two signals is zero, PLL 30 is said to be "locked." If the phase error between the two signals $u_r$ and $u_f$ is zero for two consecutive periods, the signals are identical in frequency as well.

PLL 30 is generally formed with three components, namely: phase detector 32, loop filter 34, and voltage-controlled oscillator ("VCO") 36. The particular form of each PLL component will vary for different types of applications. However, the overall principle of operation remains the same.

The first component of PLL 30 is phase detector 32. Phase detector 32 compares the phase of the reference signal $u_r$ with the phase of the output feedback signal $u_f$. Phase detector 32 then produces a phase difference signal $u_d$, which is proportional to a difference in phase of the two signals. The phase detector 32 is modeled as a linear device even though such linear behavior is generally considered impossible to achieve under a digital circuitry implementation. The output of phase detector 32 can be found from equation (2.1) set forth below, where $u_d$ is the phase difference signal output from the phase detector, $K_p$ is the gain of the phase detector, and $\theta_e$ represents the phase error.

$$u_d(t) = K_p \theta_e \qquad (2.1)$$

Loop filter 34 is the next component of the PLL 30 to be addressed. Simply described, loop filter 34 is a low pass filter. Loop filter 34 operates on the output of phase detector 32, i.e. $u_d$, to filter high frequency noise from the system. Depending on the particular type of phase detection, loop filter 34 may be used to filter an unwanted AC component from the phase detector. Usually, loop filter 34 is either a first, second, or third order filter, which may be either active or passive.

In most PLL applications, the design of the loop filter 34 determines the closed-loop dynamics of the entire PLL system. Once the type of each component is determined, the loop filter 34 is designed to optimize the desired performance parameters. Several methods can be used to optimize loop filter 34 including gain and phase margin, Nyquist plots, and pole placement using the root locus method.

The last component of the PLL 30 is voltage-controlled oscillator ("VCO") 36. The input to VCO 36 is the output $u_v$ of loop filter 34, which is an analog voltage. From this analog voltage signal $u_v$, the VCO 36 produces an oscillatory output signal $u_f$ which can be either digital or analog. The angular velocity of this output signal $u_f$ is a function of the output voltage of loop filter 34 as given by the following equation 2.2:

$$\omega_2(t) = \omega_0 + K_f u_v(t) \qquad (2.2)$$

where $\omega_0$ is the center frequency of the VCO 36, $K_f$ is the gain of VCO 36, $u_v$ is the output of loop filter 34, and $\omega_2$ is the angular frequency of the output signal $u_f$ from VCO 36.

Although all three components of the PLL 30 set forth above have both analog and digital counterparts, only the digital form of phase detector 32 and the digital form of loop filter 34 will be discussed in depth below. In the particular application of an ink-jet printer, a DC servo motor print carrier system with encoder feedback is used as the VCO 36.

The task of the phase detector 32 in PLL 30 is to compare the phase of the reference signal $u_r$ with the phase of the output signal $u_f$. The first step in this process is the sampling of the two signals. There are two techniques that may be used for sampling. One technique is "uniform sampling" where the signals are sampled at uniform intervals, such as at the Nyquist frequency. However, if the input signals are digital, a uniform sampling technique will consume unnecessary processor bandwidth and produce superfluous information. Thus, a second, more preferable technique, is to sample at non-uniform intervals.

In the non-uniform sampling technique, if the input signals are digital, sampling can be triggered by the rising and falling edges of the signals. Since the signals considered in the preferred embodiment are all digital, the preferred phase detectors are of the non-uniform sampling type.

It is possible to use an EXOR gate or flip-flops as the phase detector 32. However, each suffers from disadvantages when used in an all-digital phase locked loop. The EXOR gate requires that the input signals have a 50% duty cycle, which is impractical in many instances. Also, the EXOR type phase detector can only maintain phase tracking when the phase error $\theta_e$ is confined to the range $$\frac{-\pi}{2} < \theta_e < \frac{\pi}{2}. \qquad (2.3)$$

Likewise, the flip-flop phase detector, in the form of an SR latch, is designed such that the output is "set" on a positive transition of the reference signal $u_r$ and "reset" on a positive transition of the PLL output feedback signal $u_f$. When the two input signals are 180° out of phase, the feedback signal $u_f$ will be the same frequency as the reference signal $u_r$ with a 50% duty cycle. For the flip-flop phase detector, the phase error information is carried in the duty cycle of the output signal, with a 50% duty cycle being defined as zero phase error. The phase error $\theta_e$ range in which the phase detector can continue tracking is increased over the EXOR gates in accordance with the following equation:

$$\pi < \theta_e < \pi \qquad (2.4).$$

However, the flip-flop phase detector will respond identically for a phase error of either 181° or 1°. With this type of response, the system is sensitive to harmonics and may lock onto frequencies that are integer multiples of the reference frequency. This may prevent many PLL systems from fully locking with the reference signal $u_r$.

In view of the above, The drawbacks with the phase detectors discussed above can be overcome with the use of a phase-frequency detector (PFD). Just as its name implies, the output of the PFD is a function of frequency, as well as phase. The output of the phase detector will now become $$u_d(t) = K_p \theta_e + K_v \frac{d\theta_e}{dt}. \tag{2.5}$$

The PFD as a phase detector is preferred over the EXOR and the flip-flop detectors. The capability of the PFD will keep the PLL from locking onto harmonics of the reference frequency $u_r$, as in the case with the EXOR and flip-flop phase detectors. Another benefit is that PLLs implemented with a PFD will be able to lock onto the reference frequency $u_r$ even with an initial frequency error, such as during start up of a DC motor.

Figure 2:
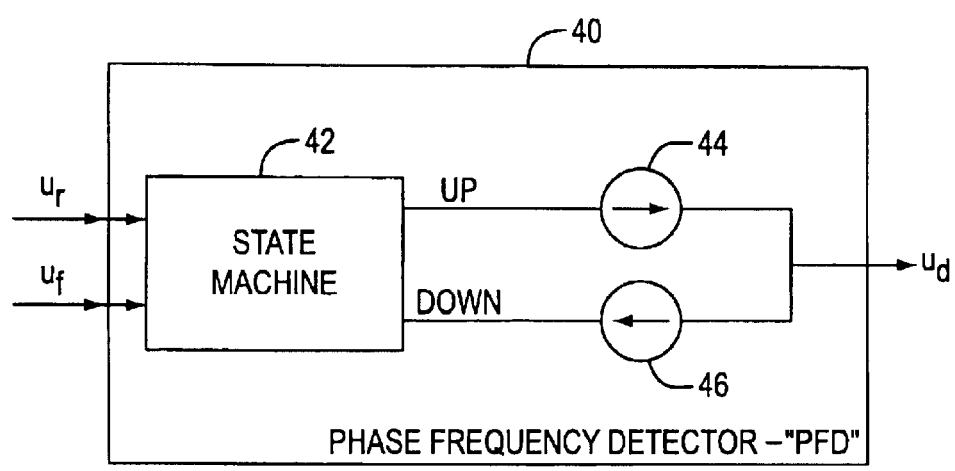
FIG. 2 is a block diagram of a phase detector in the form of a phase-frequency detector ("PFD").

FIG. 2 is a block diagram of a phase detector in the form of a phase-frequency detector ("PFD") 40 according to a preferred embodiment of the present invention. PFD 40 may therefore be substituted for phase detector 32 in FIG. 1. As illustrated, PFD 60 receives input signals $u_r$ and $u_f$ into state machine 42. State machine 42 responds by outputting signals of UP, DOWN, or "no output." State machine 42 is connected to first charge pump 44 and second charge pump 46. Charge pumps 44 and 46 are modeled as ideal current sources. Thus, in response to the an UP signal, a DOWN signal, or "no output," the output $u_d$ is either positive current, negative current or no current. An output of "no output" is a high impedance output, which is electrically modeled as an open circuit.

When the UP signal instructs charge pump 44 to output a positive current as output signal $u_d$, the charge pump 44 is active as a current source. This output signal $u_d$ increases, thereby charging the loop filter 34. In turn, the output frequency of the VCO 36 will increase. Conversely, when DOWN is active, the output signal $u_d$ decreases, thereby causing the output frequency of VCO 36 to decrease. Only one output signal UP or DOWN is active at a time.

Figure 3A:
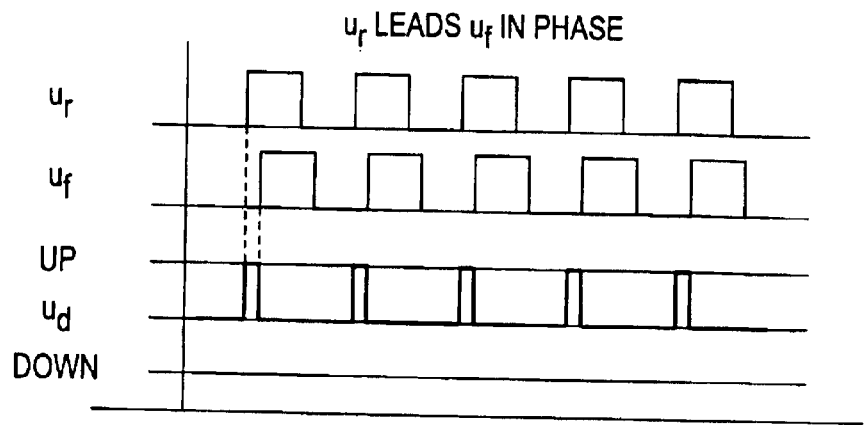
FIGS. 3A, 3B, and 3C are graphs illustrating signal operation of the PFD.
Figure 3B:
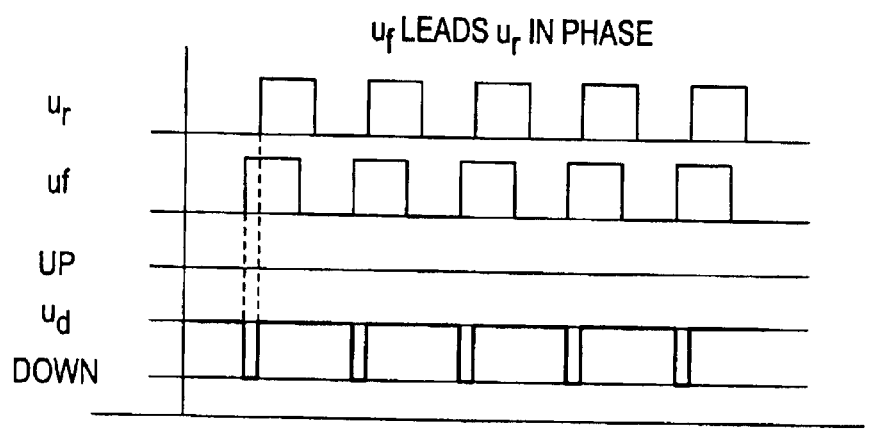
Figure 3C:
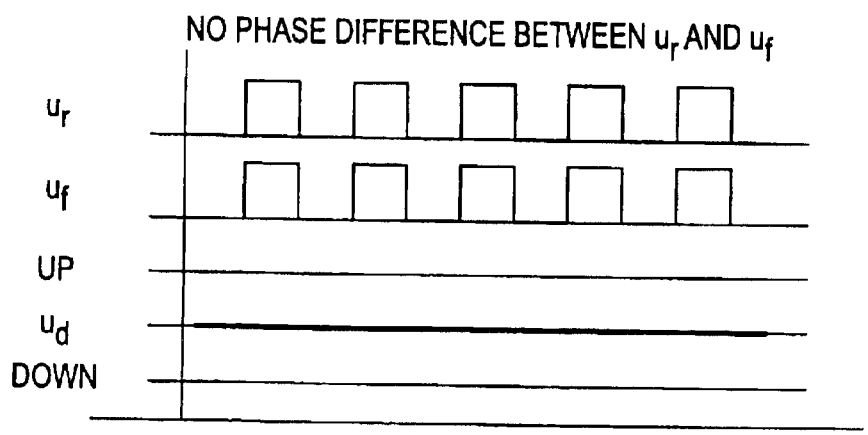

FIGS. 3A, 3B, and 3C graphically illustrate signal operation of PFD 40. As illustrated in FIG. 3A, when the reference signal $u_r$ leads the feedback signal $u_f$, the UP signal is active. On the other hand, when the feedback signal uf leads the reference signal u, the DOWN signal is active. When the reference signal $u_r$ is the same as the feedback signal $u_f$, the PLL is "locked" and both output signals UP and DOWN are inactive. In this case, the output signal $u_d$ from PFD 40 appears electrically as a high impedance state, which is effectively no output signal.

The output signal $u_d$ from PFD 40 is controlled by state machine 42. According to one embodiment, state machine 42, may be implemented as a state machine having three states through the use of two flip-flops. However, according to a preferred embodiment, state machine 42 is a state machine having eight states. An example of a state machine having eight states is model MC4044/4344 manufactured by Motorola. The PFD of either system will operate in the same manner with the simple phase differences shown in FIGS. 3A to 3C. However, the fashion in which the PFD state machines handle a phase error greater than $2\pi$ may vary greatly. In short, a state machine having eight states is preferred because the state machine may have an internal memory function for addressing different system events.

Figures 4, 5:
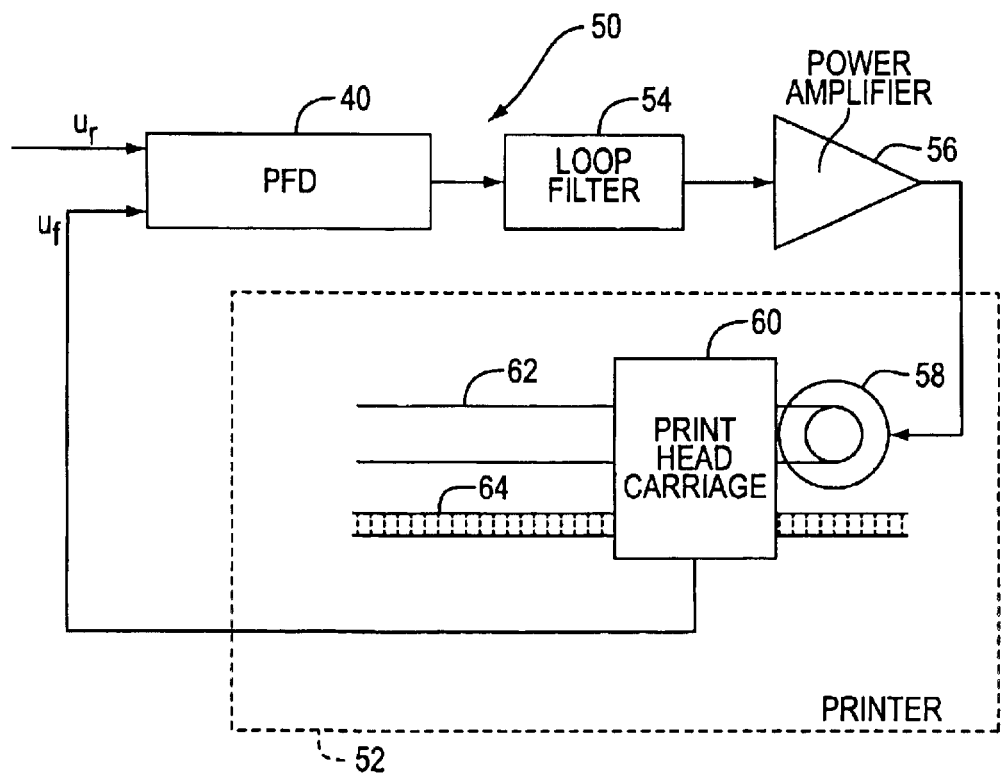
FIG. 4 is a state transition table used to control a state machine within the PFD.
FIG. 5 is a block diagram of a closed-loop phase-locked loop motor control system according to a preferred embodiment of the present invention.

FIG. 4 is a state transition table, which is used to operate state machine 42 within PFD 40. The state transition table of FIG. 4 is particularly optimized to control the Motorola MC4034 state machine when operated as a phase detector. In the state transition table for the state machine, $u_r$ is the reference signal, $u_f$ is the feedback signal, and UP and DOWN are the outputs from state machine 42. According to convention, the state transition table of FIG. 4 uses "( )" to denote a resting state. Thus, for example, row 1 indicates a resting state of state 1 corresponding to $u_r$=0 and $u_f$=0, with outputs of UP=0 and DOWN=1. Thus, for values of $u_r$=0 and $u_f$=0; or for values of $u_r$=1 and $u_f$=0, the output from state machine 42 remains UP=0, and DOWN=1. However, if the state machine is in state 1 and values change to $u_r$=0 and $u_f$=1; or if the values change to $u_r$=1 and $u_f$=1, then the state changes to state 2. As illustrated, state 2 corresponds to the second row, and the state machine 42 outputs the values UP=0, and DOWN=1

Because the phase detector is a highly complex device, small changes in the state transition table may be needed to fully optimize the design. These changes will be discussed in more detail below.

When choosing the type of phase detector, there are several factors to consider. The EXOR type of phase detector and the flip-flop type of phase detector are relatively simple to implement, and also have the advantages of reduced circuitry. However, operation is limited to phase detection systems, which are not expected to have a large phase or frequency error. The PFD, on the other hand, works very well with PLL systems, which could have a large phase or frequency error such as during start up of a DC motor. Furthermore, systems, which have to track a time-varying reference signal, need the frequency tracking capabilities of the PFD. In addition, the state machine of the PFD may be easily modified to optimize the design parameters of the system.

We turn now to a more detailed review of the loop filter 34 from FIG. 1. Historically, PLLs have been designed for use in signal processing applications and hence loop filter 34 has evolved as an analog device. Accordingly, traditional signal filter theory has been used to analyze PLL components. However, in accordance with the present invention, the PLL 30 is applied to motor control, and in particular DC motor control. Accordingly, control system theory is preferably used in the analysis and design of a PLL system. For instance, low-pass filters are analyzed as lag or lead compensators.

Loop filter 34 in PLL 30 may be designed as a lag compensator in control system theory. The compensator, either passive or active, is designed to meet transient and steady-state error requirements. The transfer function of a simple zero passive lag compensator is given by function 2.6 as follows:

$$G_c(s) = \frac{1}{1+sRC}. \tag{2.6}$$

As the type of control system increases, the complexity of the compensator will also increase. When higher order system compensators are used in an analog design, it is difficult to maintain stability if any of the resistor or capacitor values change over time.

Digital loop filters have several similarities to the analog loop filters set forth above. The digital equivalent of an analog integrator is a digital accumulator. The general concept behind the digital loop filter is to convert the phase error generated by the phase detector, which is usually a function of time, into a function of voltage. This process is accomplished in many different ways with many different configurations of digital accumulators. Although most analog loop filters have a common configuration, their digital counterparts rarely obey such standards.

However, the type of digital loop filter needed in an application depends greatly on the type of phase detector 32 and VCO 36 used in the PLL 30. As stated above, it is difficult to separate the phase detector from the loop filter. In those configurations, a binary word rather than just a binary signal is delivered from the phase detector to the loop filter. Therefore, the loop filters may be separated into two classes, namely: serial loop filters which receive phase error information in series with one or two binary value signals; and parallel loop filters which receive information in parallel with a binary word.

A serial input loop filter is one of the simplest digital loop filters. A serial input loop filter may be built from an UP/DOWN counter. This type of loop filter may be used in PFD phase detectors. A clock with a frequency greater than the reference frequency of the PLL is input to the counter. The output of the phase detector then determines whether the counter will count UP or DOWN. The content of the counter is then passed to the VCO. This counter can be approximated by equation 2.7 as follows:

$$G_c(s) = \frac{1}{sT} \qquad (2.7)$$

where T is the integrator time constant.

One type of digital loop filter, which is widely used, is the K counter. This type of loop filter has been used with either the EXOR or flip-flop phase detectors. However, the K counter is not preferred in practice of the present invention because, as set forth above, a PFD type phase detector is needed in motor control applications.

In some applications, a type of sequential filter is used as a digital loop filter. The output of sequential filters is not a linear function of a fixed number of inputs. Rather, the sequential filter observes the input and creates an output when a confidence level has been reached. One type of sequential filter is the N-before-M filter. This filter works in conjunction with phase detectors, which generate two signals, such as the PFD 40. The lead and lag inputs, which are the UP and DOWN outputs of the PFD, are accumulated separately by two N counters. The M counter (N<M<2N) accumulates both lead and lag inputs. Initially, all three counters are reset. Subsequently, the counters will accumulate until one of two conditions is met. The first condition checked is the content of the lead or lag counter. If either of these fill up, then the advance or retard output is set respectively, and the counters are reset. The second condition is the content of the M counter. If this counter fills up, all the registers are reset, and no output is produced. This condition is most likely to occur if the phase error is nearly zero.

Another type of digital filter is the parallel input loop filter. The parallel input loop filter is a digital loop filter which receive an N-bit parallel input signal. Parallel input loop filters are quite similar to analog loop filters. With an N-bit input, the loop filter can be configured as easily as a digital filter with the following transfer function:

$$F(z) = \frac{U_v(z)}{U_d(z)} \qquad (2.8)$$

where $U_v$ and $U_d$ are the z-transforms of the outputs of the loop filter and the phase detector respectively. In the time domain, the filter will be of the form $$u_v(nT)=b_oU_d(nT)+b_1u_d([n-1]T+ \ldots +a_1u_v([n-1]T)+a_2u_v([n-2]T)+ \quad (2.9)$$

where T is the sample interval, and the $a_i$ and $b_i$ terms are the filter coefficients. These terms control the characteristics of the filter. Just as in the case of the analog filters, the digital filters will control the closed-loop characteristics of the PLL.

The above digital filters can be analyzed as digital compensators. Control theory is then used to set the closed-loop settling time, steady-state error, and the stability of the system. The number of delays in the recursive equation (2.9) is equal to the order of the system. As the order increases, the complexity also increases, thereby making the system more difficult to stabilize. However, with digital filters, the only filter parameter, which can vary, is the sample interval. This is set by a very accurate clock, which makes digital filters much more accurate over time than their analog relatives.

One of the drawbacks to using PLLs for velocity control of motors is the slow transient response inherent with most PLL systems.

FIG. 5 is a block diagram of a closed-loop PLL motor control system 50. According to a preferred embodiment, motor control system 50 operates to control printer 52. As illustrated, an input signal $u_r$ is provided as a reference signal to phase-frequency detector ("PFD") 40. The output of PFD 40 is then provided to loop filter 54. The output signal from loop filter 54 is then amplified by power amplifier 56, and is in turn used to drive printer 52. In particular, the output signal from power amplifier 56 is used to drive DC motor 58 within printer 52.

DC motor 58 drives print head carriage 60 via belt drive 62. With a linear optical encoder 64 attached to print head carriage 60, the motor/print-head system will become analogous to VCO 36 in FIG. 1, where the frequency of the optical encoder signal $u_f$ is proportional to the velocity of the print-head carriage 60.

The optical encoder 64 has an output of 150 pulses/inch in quadrature. This establishes the frequency of the feedback signal uf for the PLL motor control system 50.

In order to analyze the stability of the closed-loop PLL motor control system 50 using a root-locus plot, a linear model of control system 50 is used. Both the PFD 40 and the DC motor 58 are in actuality highly non-linear devices. Therefore, according to an embodiment of the present invention, several assumptions are made in order to derive linear approximations for these components.

As illustrated in FIG. 5, PFD 40 serves the function of a phase detector in the present invention. The PFD 40 will not lock onto harmonics of the reference signal $u_r$ and is valid for any frequency or phase difference. This is important in print head control applications because there will always be a large initial frequency difference at the beginning of a print move. Also, the PFD 40 set forth above is preferably implemented with solid state machine 42, which is relatively simple to build into an ASIC.

The control system 50 takes the form of a phase locked loop. Accordingly, when the control system 50 is in a locked mode of operation, the output of the PFD 40 can be modeled as a linear device such that $$u_d(t) = K_p \theta_e + K_v \frac{d\theta_e}{dt} \qquad (3.1)$$

where $K_p$ is the phase gain, $K_v$ is the frequency gain, and $\theta_e$ is the phase error. This output is only linear in phase for small phase differences in the range $-2\pi$ to $2\pi$. If the phase error is normalized in this range, then the constant $K_p$ will become $$K_p = \frac{1}{2\pi} \qquad (3.2)$$

since the maximum phase error is $2\pi$. The frequency gain can be found experimentally by inputting two constant frequency signals into the PFD 40 and measuring the error. The measured value of $K_v$ is approximately 0.004.

When the control system 50 is operating in an unlocked state, the PFD 40 behaves in a highly nonlinear manner. This non-linearity in the unlocked state must be addressed such that PFD 40 may effectively control a DC motor, such for an inkjet print head carriage.

The PFD 40 is first modeled to determine the amount of non-linearity in the system. After the PFD 40 is modeled, the results are used to design closed-loop PLL motor control system 50.

Figure 6:
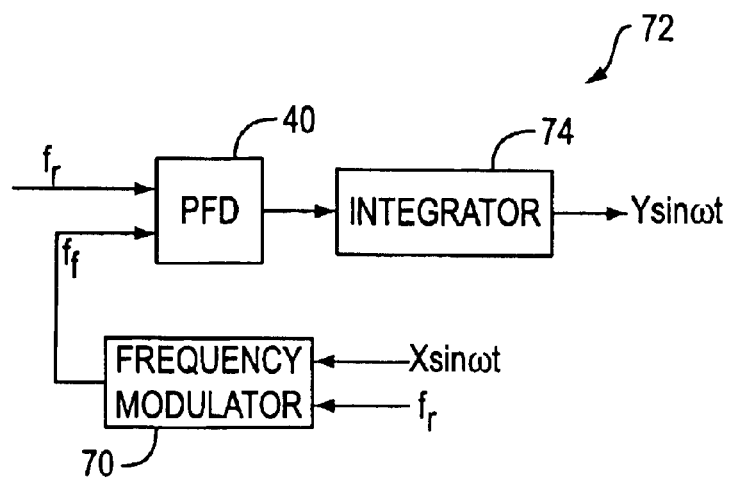
FIG. 6 is a block diagram of a system model for determining design parameters of the PFD in a non-linear state.

FIG. 6 is a block diagram of a system model for determining design parameters of PFD 40 in a non-linear state. As illustrated, PFD 40 receives an input reference frequency signal $f_r$. The reference signal $f_r$ is also input to frequency modulator 70. The frequency modulator 70 modulates the reference frequency $f_r$ with an input modulation signal $X\sin\omega t$ to produce feedback frequency $f_f$, which is then input into PFD 40. The output from PFD 40 is then integrated to average the output of the PFD 40. and thereby produce the output $Y\sin\omega t$. If PFD 40 was a linear device, the output $Y\sin\omega t$ would equal the input $X\sin\omega t$. However, the signals are different due to the non-linearity of PFD 40.

FIGS. 7A–7D are graphs illustrating non-linearity inherent in state machine 42 of PFD 40 when operating in the unlocked state. As illustrated in each of FIGS. 7A–7D, the y axis is defined as $Y\sin\omega t$. This non-linearity may be characterized by plotting average output voltage of the PFD versus $f_r/f_f$ ratio, where $f_r$ is the reference frequency signal and $f_f$ is the feedback frequency signal. However, it should be noted that for any $f_r/f_f$ ratio, the output voltage is multi-valued. Thus, there are a few shortcomings to this method.

One problem is that in order to calculate the $f_r/f_f$ ratio, both frequency inputs to the phase detector need to be constant for a certain predetermined time period. This is in contrast to a more conventional operation in which the feedback frequency $f_f$ is usually continuously changing in an unlocked condition.

According to a preferred embodiment of the present invention, a describing function is used to represent PFD 40 in the form of a non-linear device. In general, the describing function of a nonlinear element is defined as a complex ratio of the fundamental harmonic component of the output with respect to the input. Thus, in mathematical notation, the describing function N is represented as $$N = \frac{Y_1}{X} \angle \phi_1 \qquad (3.3)$$

where N is the describing function, X is the amplitude of the input sinusoid, $Y_1$ is the amplitude of the fundamental harmonic component of the output, and $\phi_1$ is the phase shift of the fundamental harmonic component of the output.

FIG. 6 is used as a mathematical model for calculation of the describing function. In order to calculate the describing function N for a nonlinear device, $Y_1$ must be found as a function of X. Since the PFD 40 has two inputs, i.e. $f_r$ and $f_f$, the calculation of the describing function will not be straight forward.

A method for applying appropriate inputs to the PFD 40 must be found in order to calculate an appropriate describing function. Since the describing function should accurately model the PFD 40 in a closed-loop PLL configuration, such as in control system 50, the two PFD inputs $f_r$ and $f_f$ should be as close as possible to actual inputs encountered in a phase lockup operation.

In order to simulate the inputs as close as possible, we turn now to the preferred embodiment of the control system 50 for use with a DC motor, and in particular to a DC motor for an inkjet printer. At the beginning of each print move, the velocity of the print head carriage 60 will be zero. The feedback frequency $f_f$ will be zero as well. As the printing process starts, the feedback frequency $f_f$ will increase until lockup occurs, i.e. until feedback frequency $f_f$ reaches the reference frequency $f_r$.

One way to emulate the above print head characteristic system response is to set reference frequency $f_r$ to a constant and modulate the feedback frequency around a sine wave.

FIG. 6 illustrates a block diagram of an emulation system 72 including PFD 40, frequency modulator 70 and integrator 74. As illustrated, X is the amplitude of the modulated sine wave and Y is the amplitude of output sine wave. Since the output information of the PFD 40 is contained within the average of the output from PFD 40, i.e. from an average of the square wave output, an integrator 74 receives the output from the PFD 70 in order to measure the phase-frequency error.

The emulation system 72 is modeled and simulated using a digital computer. For purposes of experimentation, the reference frequency $f_r$ to be input to PFD 40 is set to 9600 Hz, which is equivalent to a print speed of 16 inches/sec. Of course, for an increase in print speed, the reference frequency should changed. The feedback frequency $f_f$ is therefore determined as follows:

$$f_f = X\sin(200t) \qquad (3.4)$$

where X is swept from 1 Hz to 24 kHz in increments of 7 Hz. For each value of X, the system is simulated for a length of time equal to one period of $f_f$. The initial phase difference between the reference signal $f_r$ and the feedback signal $f_r$ is set to zero.

FIGS. 7A to 7D show the output of the emulation system 70 for several values of X. It should be noted that as the value of X increases, the output begins to distort from a sinusoidal wave into a triangle wave. This distortion effect may be neglected for purposes of determining the describing function N.

Figure 8:
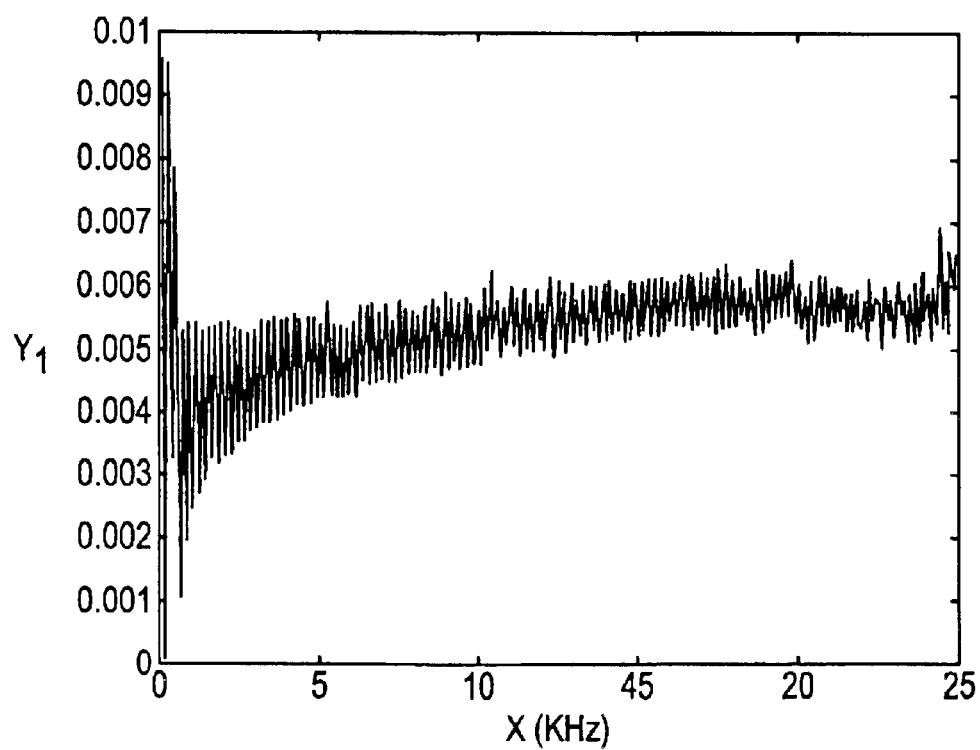
FIG. 8 is a graph illustrating non-linear output of the fundamental frequency component of the feedback frequency plotted as a function of a sweeping variable X without sinusoidal components.
Figure 7A:
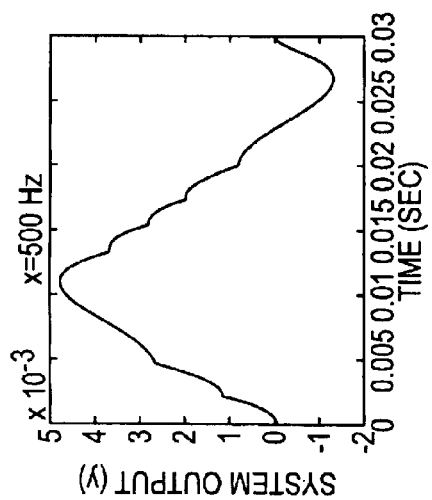
FIGS. 7A–7D are graphs illustrating non-linearity inherent in an emulation of a state machine of the PFD when operating in the unlocked state.
Figure 7B:
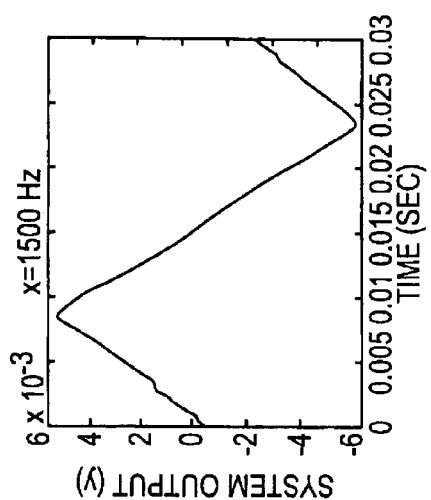
Figure 7C:
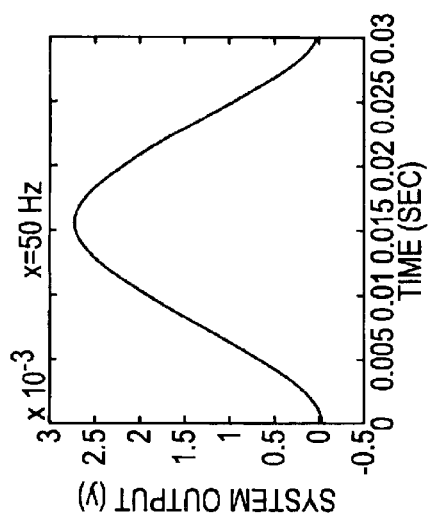
Figure 7D:
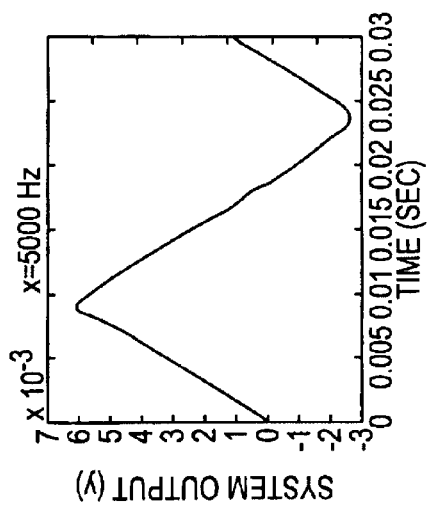

FIG. 8 is another graph illustrating the output of the emulation system 70 for varying values of X. As illustrated, the fundamental frequency component $Y_1$ of the feedback frequency $f_f$ is plotted as a function of X without the sinusoidal components, where X is swept from 1 Hz to 24 kHz in increments of 7 Hz. Only the amplitude of the output, $Y_1$, is used to determine the describing function N, where Y is the amplitude of the fundamental frequency of the output of emulation system 72. From FIG. 8, PFD 40 is shown to operate as a highly nonlinear device in the unlocked mode of operation.

The next step in the analysis of the non-linear describing function N is to calculate a mathematical representation of the function of N. The fundamental harmonic component of the output, i.e. $Y_1$, can be found from a Fourier series representation of the output of the non-linear device due to a sinusoidal input. When the high frequency components from FIG. 8 are included in the analysis, it becomes impossible to find a closed form expression for the fundamental harmonic component $Y_1$.

However, a describing function is merely an estimation of non-linearity. Therefore, modeling the trend and not the high frequency components of $Y_1$ will be sufficient to practice the present invention. Consequently, a least squares method can be used to model the data and determine the describing function.

Figure 9:
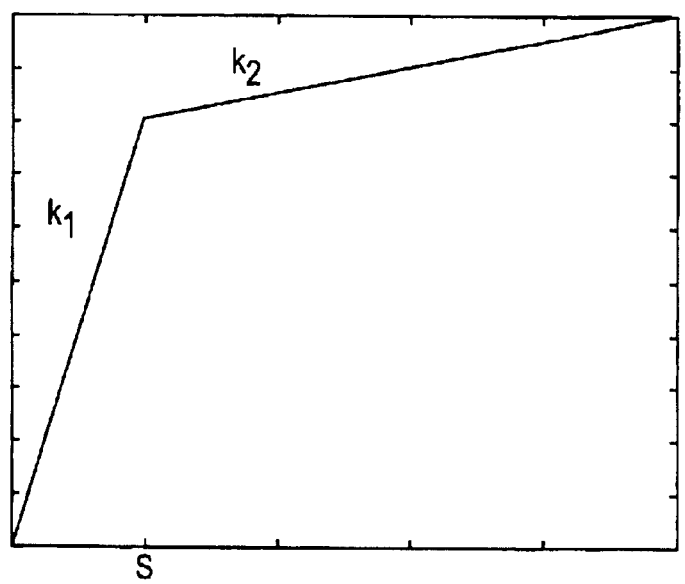
FIG. 9 is a graph of a model for the non-linear output data of FIG. 8, where $k_1$ and $k_2$ are slopes of the illustrated lines.

FIG. 9 is a graph of a function modeling the non-linear data of FIG. 8, where $k_1$ and $k_2$ are slopes of the illustrated lines.

Figure 10:
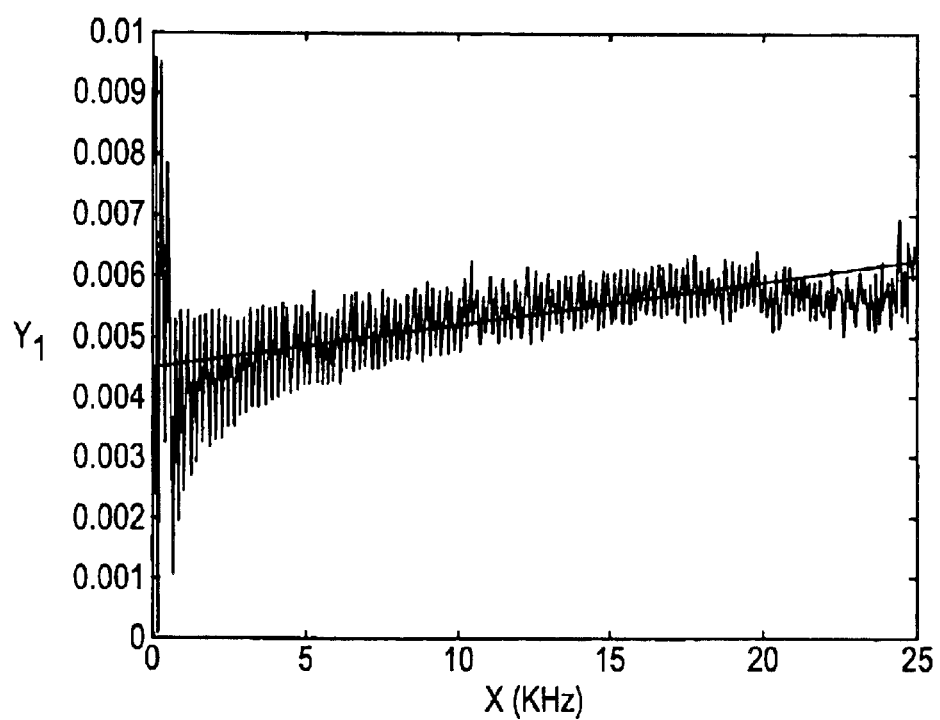
FIG. 10 is a graph of a least squares fit of the graph of FIG. 9.

FIG. 10 illustrates a plot of the least squares fit of the graph of FIG. 9 where $$k_1 = 2.66 \times 10^{-5} \tag{3.5}$$

$$k_2 = 3.66 \times 10^{-8} \tag{3.6}$$

$$S = 32 \tag{3.7}$$

At this point, a closed form expression can be found for $Y_1$. Since the characteristic curve is skew symmetric, the Fourier series expansion of $y_1(t)$ involves only odd harmonics. Also $f_i(t)$ and $y_1(t)$ are in phase. Therefore, $y_1(t)$ can be expressed as $$y_1(t) = Y_1 \sin \omega t \tag{3.8}$$

where $$Y_1(t) = \frac{4}{\pi} \int_0^{\frac{\pi}{2}} y(t) \sin \omega t \, d(\omega t). \tag{3.9}$$

From FIG. 10, the expression for the simplified output will become $$y(t) = \begin{cases} k_1 X \sin \omega t & \text{for } 0 \leq t < t_1 \\ k_2 X \sin \omega t & \text{for } t_1 \leq t < \frac{\pi}{2\omega} \end{cases} \tag{3.10}$$

and $$X \sin \omega t_1 = S \tag{3.11}$$

Integrating equation (3.9) will yield $$Y_1 = X k_2 + \frac{2X(k_1 - k_2)}{\pi} \left( \sin^{-1} \frac{S}{X} + \frac{S}{X} \sqrt{1 - \frac{S^2}{X^2}} \right). \tag{3.12}$$

The describing function N can then be given by $$N = \frac{Y_1}{X} = k_2 + \frac{2(k_1 - k_2)}{\pi} \left( \sin^{-1} \frac{S}{X} + \frac{S}{X} \sqrt{1 - \frac{S^2}{X^2}} \right) \tag{3.13}$$

$(X \geq S)$.

Figure 11:
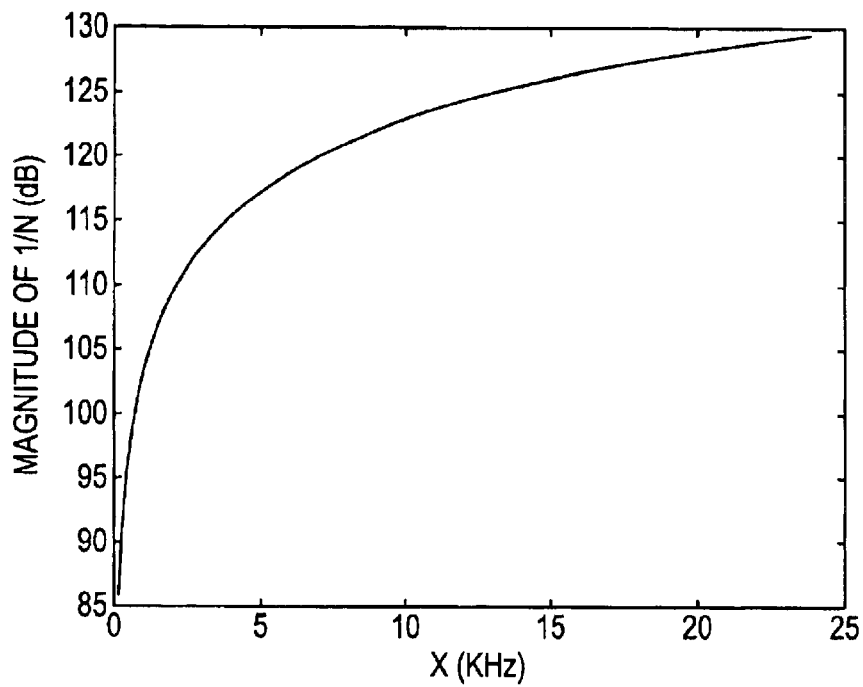
FIG. 11 is a graph illustrating an inverse plot of the magnitude of a describing function for the system model of the PFD in a non-linear state.

FIG. 11 is a graph illustrating a plot of the magnitude of $1/N$ as a function of X. In other words, FIG. 11 is a graph illustrating an inverse plot of the magnitude of the describing function N. Since N is entirely real valued, $-1/N$ will lie entirely on the negative real axis.

In order to use analysis methods with the describing function, the value of X must remain constant for the entire analysis. However, if X is the actual value of the error between the reference frequency $f_r$ and the feedback frequency $f_f$, then X will change as the system is set into motion. Therefore, an assumption is made for the value of X used in the analysis.

As evident from FIG. 11, the largest expected error occurs prior to the actual printing process, when the velocity of the print head carriage is zero. Accordingly, the worst case value for X will be equal to the value of the reference frequency $f_r$ for each print speed. Of course, X is the difference between the reference frequency $f_r$ and the feedback frequency $f_f$. The maximum of X is therefore achieved when the feedback frequency $f_f$ is 0.

For the preferred embodiment where an inkjet carriage system, which is belt driven by a DC motor, is the subject of a model, the inputs and outputs of the model are discussed herein below.

The carriage system may be modeled as a fifth order system with the following state vector:

$$z = |\dot{x} x r \dot{\phi} r \phi \tau_m| \tag{3.14}$$

where x is the linear position of the carriage, $r\phi$ is the angular position of the gear driving the belt, and $\tau_m$ is the torque of the DC motor. In state space form, the system will become:

$$\dot{z} = Az + Bu \tag{3.15}$$

where A is a 5×5 matrix, B is a 5×3 matrix, and $$u = [-F sgn(\dot{x}) - P sgn(r\dot{\phi}) v] \tag{3.16}$$

where the first term represents the friction on the carriage guide rod, the second term represents the friction at the motor bearings, and the third term represents the voltage input to the DC motor. The gain of the power amplifier, $K_a$, is 30.

Figure 12:
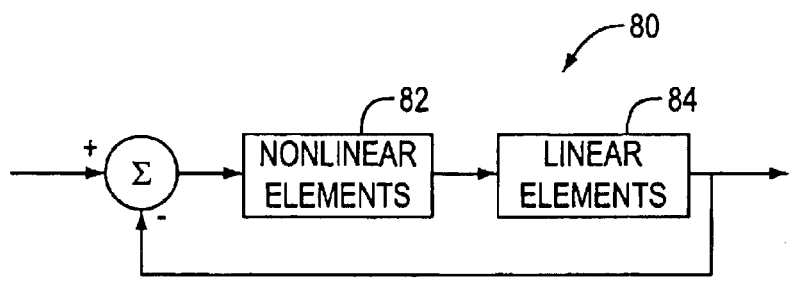
FIG. 12 is a general block diagram of a closed-loop nonlinear control system having linear and non-linear elements.

Turning now to FIG. 12, according to a preferred embodiment of the present invention, the PLL system is designed with nonlinear control analysis using describing functions. FIG. 12 is a general block diagram model of a nonlinear control system 80 where the nonlinear elements 82 are modeled with a describing function, and the linear elements 84 are modeled using standard linear system analysis methods. If the higher harmonics are sufficiently attenuated, the describing function of the nonlinear control system N can be treated as a real variable or complex variable gain. The closed-loop frequency response then becomes $$\frac{Y(j\omega)}{X(j\omega)} = \frac{NG(j\omega)}{1 + NG(j\omega)} \tag{3.17}$$

The characteristic equation for the function is $$1 + NG(j\omega) = 0 \tag{3.18}.$$

Solving (3.18) for $G(j\omega)$ gives $$G(j\omega) = -1/N \tag{3.19}$$

If this equation is satisfied, then the system will exhibit a limit cycle. This is analogous to the conventional frequency-response case where the $G(j\omega)$ locus passes through the critical point, $-1 + j0$. In describing function analysis, the entire $-1/N$ locus becomes a locus of critical points. Thus, the relative location of the G(jω) locus and the −1/N locus will provide the stability information.

The stability of the system can be determined by plotting G(jω) and −1/N on the same axis. If the −1/N locus is not enclosed by the G(jω) locus, then the system is stable and no limit cycle exists at steady-state. Otherwise, if the −1/N locus is enclosed by the G(jω) locus, then the system is unstable. If the −1/N locus and the G(jω) locus intersect, then the output may exhibit a sustained oscillation, or a limit cycle.

The frequency response methods are methods for analysis and design of control systems. The frequency response of a system is the steady-state response due to a sinusoidal input. This response can be calculated or measured by varying the input frequency over the range of interest and observing the output.

The describing function is intended to be a frequency response method of designing and analyzing nonlinear systems. By utilizing the Nyquist stability criterion, a valid compensator stabilizes the nonlinear PLL-carriage control system. However, this design methodology suffers from some disadvantages.

There is an assumption with this method that the system is in steady-state. Of course, driving the print head carriage to a steady-state velocity is the primary goal of the present PLL controller. If a stable controller is designed, the carriage will eventually achieve steady-state, but the frequency response method will not allow the transient response parameters to be controlled.

The root locus method does allow the specification of transient response parameters. If the system is linear, a compensator can be designed to stabilize the system in steady-state and to meet the transient response requirements. Normally, a describing function is not used in root-locus analysis since it is a function of frequency. However, the describing function found for the PFD is simply a gain for each reference frequency. Since the reference frequency is constant for any one print move, the describing function N can be added to the open loop transfer function of the PLL system (as shown in FIG. 12) in order to derive an appropriate compensator using the root locus analysis.

A preferred method of showing a relationship between a system's poles, gain, and stability is a graphical technique called the root locus method. With this method, it is possible to visually examine a system to determine relative stability at any gain. The root locus is simply a plot of system closed-loop poles on the s-plane as a system parameter, such as gain K or other system parameter, is varied from 0 to ∞. Whenever the root locus crosses into the right half plane, the system becomes unstable for those corresponding ranges of parameter values.

Since a transfer function representation of a system is a prerequisite to root locus construction, the state-space model of the carriage system first must be transformed into a transfer function. However, standard root locus techniques require a transfer function to be a single input/single output (SISO) system. Therefore, the velocity of the carriage is chosen as the output, and the friction inputs are assumed to be zero for the carriage system.

Since the describing function is a function of frequency, the system is analyzed as a frequency control system in the transient or unlocked mode and as a phase control system in the locked mode of operation. The open-loop transfer functions of the system in the two modes of operation are represented by $$G_{ul}(s) = NK_0 Z(s) \quad (3.20)$$

$$G_l(s) = (K_p + sK_v)K_a Z(s) 1/s \quad (3.21)$$

where $G_{ul}(s)$ represents the system in unlocked mode, G(s) represents the system in locked mode and Z(s) is the transfer function of the carriage system. The closed-loop transfer functions then become $$F_{ul}(s) = \frac{G_{ul}(s)}{1 + G_{ul}(s)}. \quad (3.22)$$

$$F_l(s) = \frac{G_l(s)}{1 + G_l(s)}. \quad (3.23)$$

FIG. 13 is a block diagram of a model of linearized system 90 of a phase-locked loop. The linearized system 90 is a mathematical model, which is provided without compensation in an unlocked mode. Likewise, FIG. 14 illustrates a model of linearized system 100 without compensation in a locked mode. Since the only difference in the two modes of operation is the phase detector gain, the shape of the root locus will be the same for both modes. Accordingly, like reference numerals denote like components throughout. Turning first to FIG. 13, reference frequency $f_r$ is combined with feedback frequency $f_f$ in summation block 92. The combined signals are then output to describing function gain block N94. The signal is then subjected to gain of power amplifier Ka in block 96 and subject to a transfer function of the carrier system Z(s) in block 96.

In FIG. 14, the phase of the signals of linearized system 100 is considered. Thus, in FIG. 14, reference phase $p_r$ is combined with feedback phase $p_f$ in summation block 92. However, as illustrated in FIG. 14, the summed signals are subject to a PFD transfer function in the lock mode Kp+sKv in block 102 before being subject to a gain of Ka in power amplifier block 96 and the carrier system transfer function Z(s) in block 98. In FIG. 14, the signal is further subjected to an integrator of 1/s in block 104, which represents a conversion to phase as set forth above.

Figure 15:
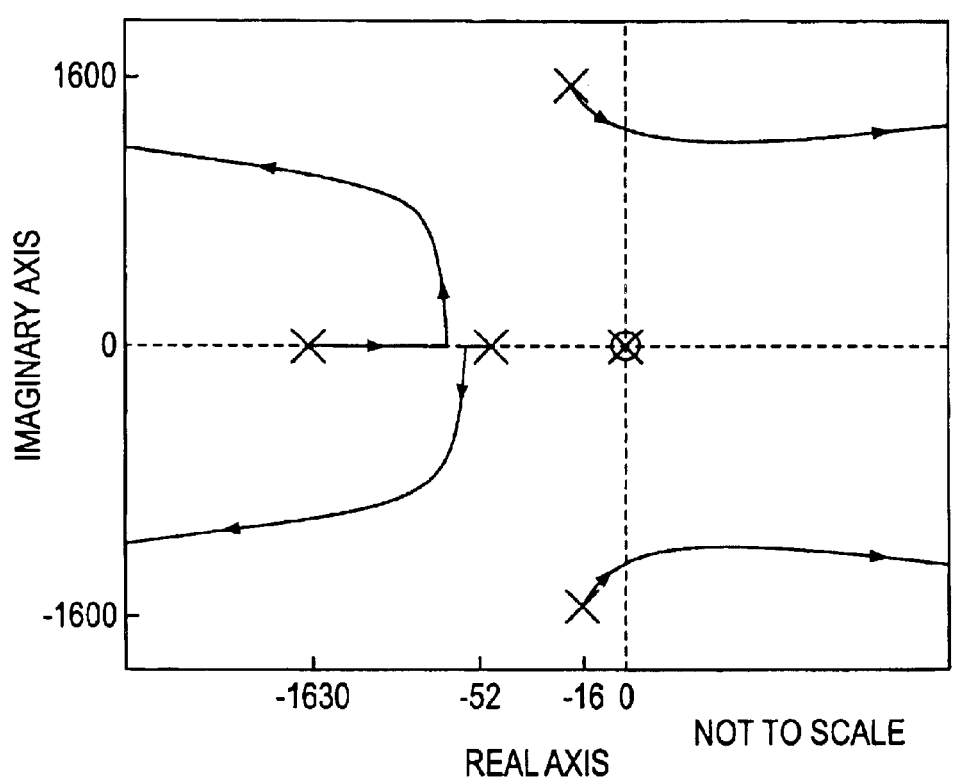
FIG. 15 is a plot of a root locus of the linearized closed-loop system of FIG. 13.

FIG. 15 is a plot of a root locus of the linearized closed-loop system of FIG. 13, which was made using a digital computer. The root locus is used to analyze a transfer function in the S domain. As illustrated in FIG. 15, there are five poles in the root locus: two on the negative real axis, one at the origin, and a complex pair very close to the imaginary axis. There is also a zero at the origin, which cancels the pole. The complex pair of poles quickly shoot into the right half plane, making the system unstable for all but the smallest values of K. It is clear that stabilizing the system for larger values of K is very important. The compensator functions as a loop filter in a PLL, such as the loop filter 34 in FIG. 5.

Compensators are preferably inserted into a system's path in order to alter the system's root locus and thereby alter the closed-loop performance of the system. The transient response, steady-state error, and stability can all be controlled by compensators. In a preferred embodiment of the invention, a lead compensator is used to stabilize the system, control the transient response, and decrease the steady-state error. The compensator functions as a loop filter in a PLL, such as the loop filter 34 in FIG. 5. The design methodology set forth below is used to design a compensator in accordance with the preferred embodiments of the present invention. Likewise, the compensator is described by equation 3.28 derived below.

Figure 16:
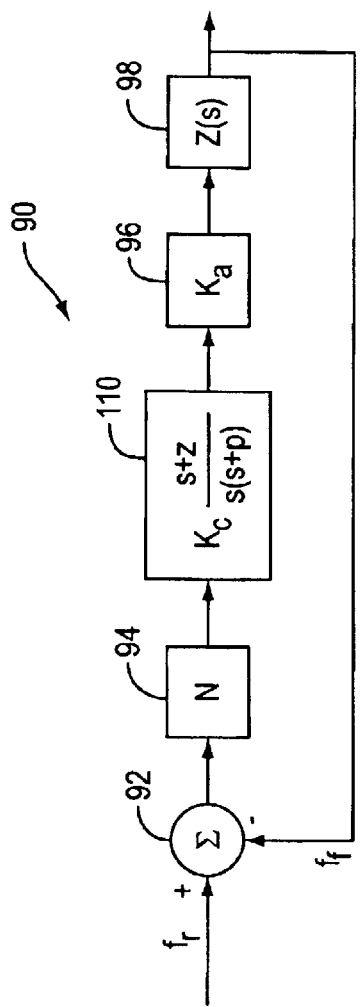
FIG. 16 is a block diagram of a linearized frequency model system of a phase locked loop, with compensation in a locked mode.

FIG. 16 illustrates a model of an entire PLL system 90 according to a frequency analysis model. To arrive at FIG. 16, equation 3.28 is a compensator and is represented by function block 110 in FIG. 16. FIG. 16 is inserted into the linearized system model 90 from FIG. 13 between N and Ka. The other system elements from FIG. 13 correspond to the illustrated system elements in FIG. 16.

Figure 17:
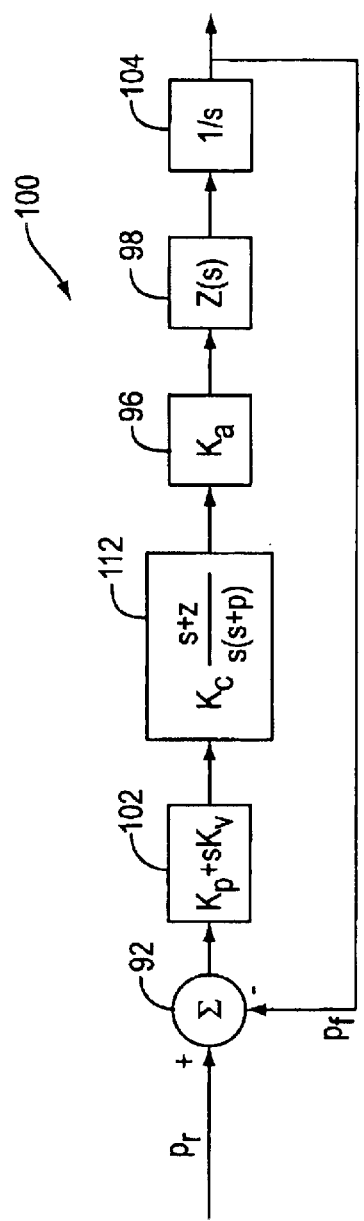
FIG. 17 is a block diagram of a linearized phase model system of a phase locked loop, with compensation in a locked mode.

Likewise, FIG. 17 illustrates a model of an entire PLL system 100 according to a phase analysis model. In FIG. 17, equation 3.28 represents a compensator and is designated by function block 112. Function block 112 is inserted into the linearized system 100 in FIG. 14 between Kp+sKv and Ka. The other system elements from FIG. 14 correspond to the illustrated system elements in FIG. 17.

The appropriate transfer function for the compensator is now described. The transient specifications for carriage speeds from 8 inches/sec to 20 inches/sec are the following: the carriage velocity should be within 10% of the reference by the time it has traveled ½ inch, the maximum overshoot should be within 20%, and the steady-state error should be within +5%. For print speeds from 20 inches/sec to 40 inches/sec, the carriage will not have to print. Therefore, at these speeds the carriage will not have to be within 10% of the reference by the time it has traveled ½ inch.

Since the carriage system initially starts from rest, the lead compensator will be designed to stabilize the system while it is in the unlocked mode of operation. The stability of the system in the locked mode of operation will then be verified. A lead compensator is of the form:

$$G_c(s) = K_c \frac{s+z}{s+p} \quad (3.24)$$

where $$p > z \quad (3.25)$$

and both p and z are positive numbers.

Another important consideration for a compensator is steady-state error inherent in the system. Since the pole at the origin is canceled by the zero, the system is a type 0 system, meaning there are no poles at the origin. Applying the Final Value Theorem to the closed-loop PLL system with the lead compensator, the steady-state error due to a step input will be $$E_{ss} = \frac{K}{1+K} \quad (3.26)$$

where K is a constant. A constant steady-state error is unacceptable in the preferred embodiment. Therefore, the system type must be increased. Adding an integrator to the compensator will increase the system type of the closed-loop PLL system to 1. This will cause the steady-state error due to a step input to go to zero. Consequently, the lead compensator will become $$G_c(s) = K_c \frac{s+z}{s(s+p)}. \quad (3.27)$$

In order to design the compensator, the carriage system is approximated as a classical second order system of the form $$\frac{Y(s)}{W(s)} = \frac{\omega_n^2}{s^2 + 2\xi\omega_n s + \omega_n^2} \quad (3.28)$$

where $\omega_n$ is the natural frequency of the system and $\xi$ is the damping coefficient. The poles of the system are then $$s = -\xi\omega_n \pm j\omega_n\sqrt{1-\xi^2} \quad (3.29)$$

By finding a dominant pair of poles, the PLL system can be approximated as a second order system. Usually the poles, which are furthest to the right in the s-plane, are dominant. However, in this system the poles furthest to the right are the complex pair at $-16 \pm j1605$. This pair will not dominate the system response since they are much closer to the imaginary axis than they are to the real axis. Therefore, they will only cause a high frequency ring in the response. Thus the pole at $s = -52$ will dominate the PLL system.

Figure 18:
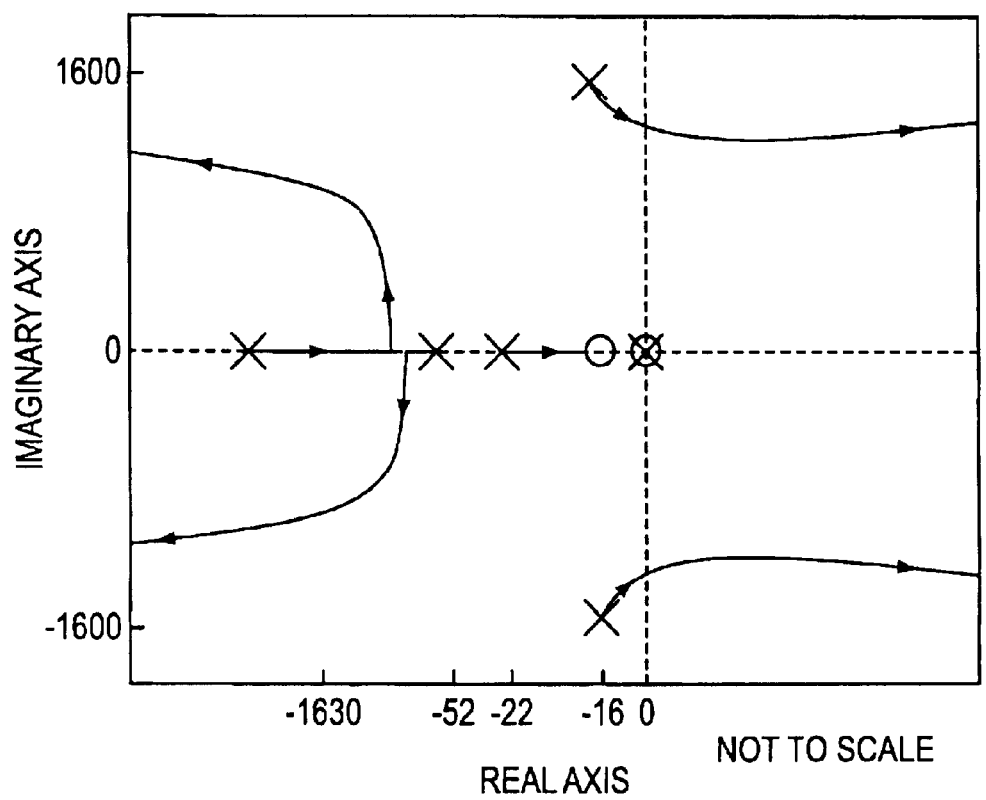
FIG. 18 is a root locus for a phase-locked loop system having a lead compensator.
Figure 19A:
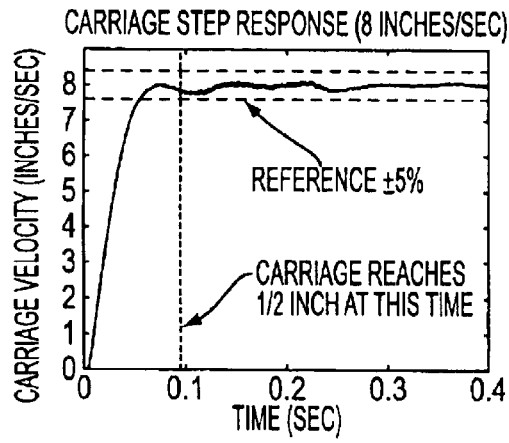
FIGS. 19A–19D are graphs illustrating step responses of a closed-loop system having responses that meet preferred transient specifications.
Figure 19B:
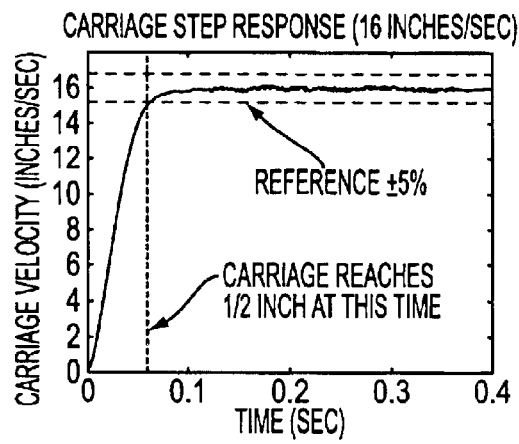
Figure 19C:
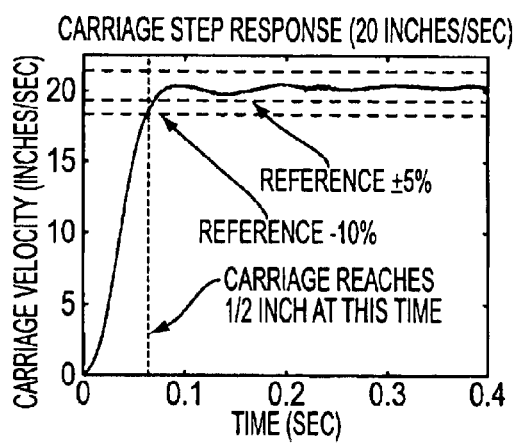
Figure 19D:
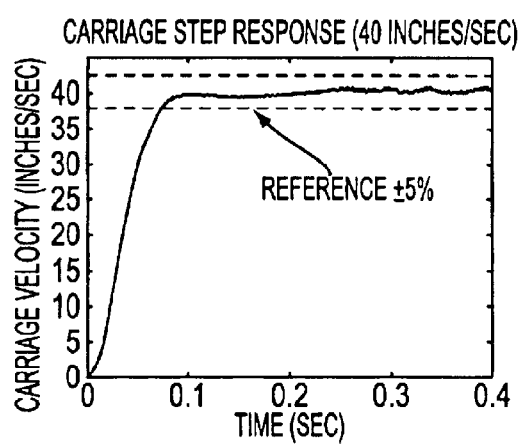

FIG. 18 is a root locus for a phase-locked loop system with a lead compensator. Since an integrator was added to the output of the PFD in order to find the describing function, it will be assumed that the integrator needed to increase the system type is modeled with the describing function. Consequently, there will be no addition of a pole at the origin in the root locus. If that is the case, it would seem that since the dominate pole at $s = -52$ meets the transient specifications, a simple gain would be all that is needed. However, the motor amplifier is physically incapable of delivering sufficient current in order for the motor to respond that quickly. Therefore, a pole and zero will be placed on the negative real axis between the origin and $-52$. The gain of the compensator will be designed in order to set the dominant pole somewhere between the pole and the zero of the lead compensator.

Since the closed-loop system is a high-order non-linear system, choosing the pole and zero, and the compensator gain will become an iterative process in order to optimize the system response. The first step in this iterative process is to pick the pole and zero for the compensator and the desired settling time for the closed-loop system. Next, the gain of the compensator can be found from the root locus magnitude condition such that $$k_{lead} = \frac{\left|\frac{s_{des}+p}{s_{des}+z}\right|}{|G_{ul}(s_{des})|} \quad (3.30)$$

where $S_{des}$ is the desired dominant pole and can be found from the following equation:

$$s_{des} = \frac{4}{t_s} \quad (3.31)$$

where $t_s$ is the desired close-loop settling time. Once these parameters have been established, a step response for the closed-loop system will be simulated using a digital computer. Programs, which are suitable for simulation of the step response for the closed-loop system, are Matlab and Simulink. The process may be repeated until the step response meets the desired transient specifications.

The optimum values found for the lead compensator parameters are the following:

$p = 22$ $z = 15$ $t_s = 15 \; sec$ \quad (3.32)

These parameters are valid for all print speeds; however the gain of the lead compensator will have to be calculated for each print speed.

FIGS. 19A–19D are graphs which respectively illustrate a step response of the closed-loop system due to the parameters of equation (3.32). As illustrated, all responses meet the preferred transient specifications. Achieving 10% of full speed within ½ inch of travel of the print head carriage is the most difficult parameter to meet. During design, overshoot may be sacrificed in order that the initial acceleration can be increased.

Figure 20:
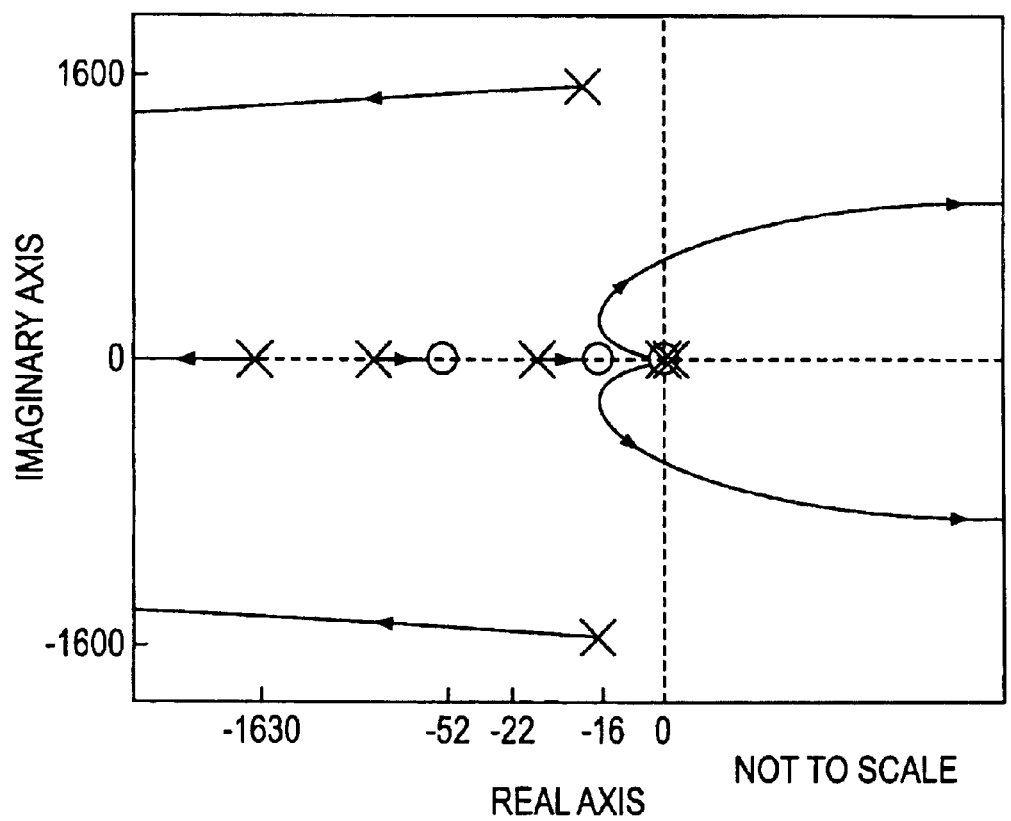
FIG. 20 is a graph illustrating a root locus for a compensated phase-lock loop system in the locked mode of operation.

FIG. 20 is a graph that illustrates the final step in the design process, i.e. verification of stability of the system in the locked mode of operation. The root locus for the compensated system in the locked mode of operations is shown. With the addition of the two poles at the origin and the zero in the left hand plane, the root locus is changed significantly from the locked state. However, for the gains used in the lead compensator design, the root locus is entirely in the left hand plane. Therefore, the system is stable in both the locked and unlocked modes of operation.

Now a method of modeling a digital phase-locked loop motor controller is set forth. Specifically, the PFD used in the DPLL is modeled with non-linear describing function analysis. This technique leads to a linearized frequency domain model of the PFD. Since the model is not dependent upon frequency, the PFD model is used in both time domain and root locus analysis.

Once the model for the PFD is determined, the entire DPLL/motor system is modeled in the unlocked mode of operation. A lead compensator is then provided to drive the system into a locked or steady-state mode of operation. This compensator meets several transient specifications. Finally, after the lead compensator is introduced, the compensated system is verified to be stable in the locked mode using root locus analysis.

TRANSFORMATION OF DPLL INTO ADPLL

As set forth above, a novel design method was developed for a DPLL ("Digital Phase Locked Loop") motor control system. Specifically, the DPLL control system was designed to control the velocity of an inkjet print head carriage system. However, the DPLL by definition is a hybrid analog/digital device. In order for the controller to be implemented into an ASIC, the entire PLL control system must be made of entirely digital devices. Thus, the DPLL will now be transformed into an ADPLL ("All Digital Phase Locked Loop").

Accordingly, the DPLL controller will now be transformed into an ADPLL design. Most of the transformation will focus on the modification of the loop filter from the completely analog device discussed above. There are several advantages inherent to a digital loop filter. One important advantage is the utilization of less space in the ASIC while meeting performance specifications.

Figure 21:
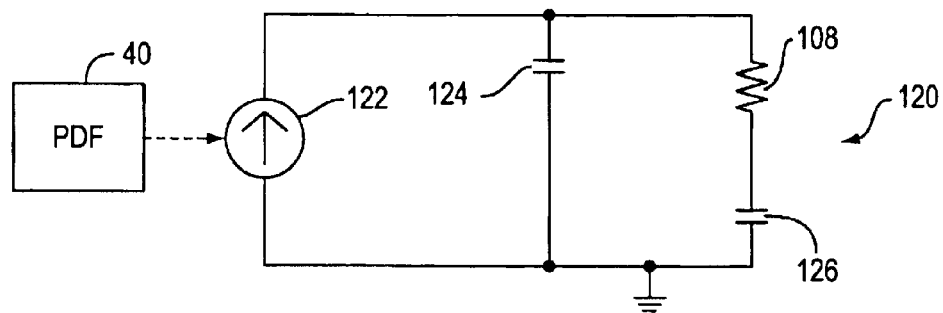
FIG. 21 is a block diagram of a loop filter that will form the basis for a digital loop filter.

FIG. 21 is a block diagram of a loop filter 120, which will form the basis for a later developed digital loop filter. As illustrated, the current source is considered the input to the analog loop filter 120 and the voltage across capacitor 124 is considered the output. Analog loop filter 120 includes a charge pump 122, first capacitor 124, a second capacitor 126 and a resistor 128. Capacitors 124 and 126 provide two independent memory storage elements for loop filter 120.

A transformation of the analog filter into a digital filter is set forth below. However, to provide implementation, several multiplication and addition operations are performed for every sample period. A microprocessor or a DSP is best suited to perform these operations. In fact, the modern control method used on the carriage system is simply a digital filter implemented with a microprocessor. Therefore, the use of a traditional digital filter in the present invention is of relatively little value.

Another approach to transforming the analog loop filter into a digital loop filter is to model the actual analog operation with a digital device. In general, the key analog device in the loop filter is the capacitor.

The digital counterpart to a capacitor is an accumulator, or a counter. Therefore, it could be possible to model an analog circuit composed of capacitors with a digital circuit composed of accumulators. The time constants of the analog circuit would correspond to the frequencies of the clocks of the counters. One of the most common digital devices implemented in printer ASICs is a simple frequency divisor since several different frequency signals are needed for printer operation. Thus, several signals with different frequency values are readily available in the ASIC.

FIG. 21 illustrates an analog filter 120, which is first examined to provide an accurate digital model. Analog filter 120 is one realization of an analog filter for PLL. For this model, PFD 40 controls charge pump 122 via control circuitry (not shown). Charge pump 122 is modeled in analog filter 120 as an ideal current source. The polarity of the current source will change between a negative and positive depending on the output of the PFD. If the PFD outputs a "DOWN" signal, the current source will be negative and will discharge capacitor 124. If on the other hand the PFD outputs an "UP" signal, the current source will be positive and will charge capacitor 126. If there is no output from the PFD, the current source will be zero. Therefore, the voltages of the two capacitors will move toward one another until they are equal.

FIG. 22 is a table that illustrates the dynamic states of the capacitor voltages corresponding to the PFD outputs for the analog filter 120.

If the capacitors in the analog loop filter are modeled with digital accumulators, the count of the accumulators will be analogous to the voltage of the capacitors. However, while the accumulators increase linearly, the voltage of the capacitors increase in a non-linear, exponential manner. Therefore, some assumptions will have to be made in choosing the frequency of the accumulators. Once the frequency of the accumulators are chosen, creating a circuit to model the operation shown in FIG. 22 is relatively straight forward.

The PFD requires two square wave inputs and then outputs a tri-state signal. The state of the PFD output has the possibility to change after every transition of either of the input signals. In printing operations, normally the frequency of the reference signal is greater than the feedback signal (unless there is overshoot). If this is the case, then the output of the PFD can change is twice the frequency of the reference signal. In fact, when the system is close to locking, the output of the PFD is changing at a rate of twice the reference frequency. Therefore, the accumulators should count at close to the same rate as the capacitor voltages charge and discharge during half of a reference period.

The first step in finding the frequencies of the accumulators is to find dynamic expressions for the capacitor voltages. Using KVL and KCL the following differential equations can be found from the analog loop filter:

$$\frac{dv_{C1}}{dt} + \frac{v_{C1}}{C_1 R} = \frac{v_{C2}}{C_1 R} + \frac{I}{C_1} \tag{4.1}$$

$$\frac{dv_{C2}}{dt} + \frac{v_{C2}}{C_2 R} = \frac{v_{C1}}{C_2 R}. \tag{4.2}$$

If current source, I, is normalized, the voltage of the second capacitor neglected, and initial conditions are set to zero, then the voltage of the first capacitor will be $$v_{C1}(t) = R\left(1 - e^{\frac{-t}{RC1}}\right) \tag{4.3}$$

Similarly, the voltage of the second capacitor is found from $$v_{C2}(t) = V_{CI}\left(1 - e^{\frac{-t}{RC2}}\right). \quad (4.4)$$

In normal operation, the voltages of both capacitors will remain close to each other. Therefore, assuming $v_{C2}$ is initially zero, the voltage of the first capacitor will become $$V_{C1} = 0.1 \quad (4.5)$$

$$v_{C2}(t) = \frac{1 - e^{\frac{-t}{RC2}}}{10}. \quad (4.6)$$

The accumulators will have a precision of 10 bits. The frequencies can be found from $$f_1 = \frac{2v_{CI}\left(\frac{T_{ref}}{2}\right) * 1024}{T_{ref}} \quad (4.7)$$

$$f_2 = \frac{2v_{C2}\left(\frac{T_{ref}}{2}\right) * 1024}{T_{ref}} \quad (4.8)$$

where $T_{ref}$ is the reference period.

As set forth above, when the digital control circuitry is added to allow the accumulators to operate in the same manner as the analog loop filter, the digital loop filter will be complete. This will allow both the PFD and the loop filter to be placed in an ASIC.

Figure 23:
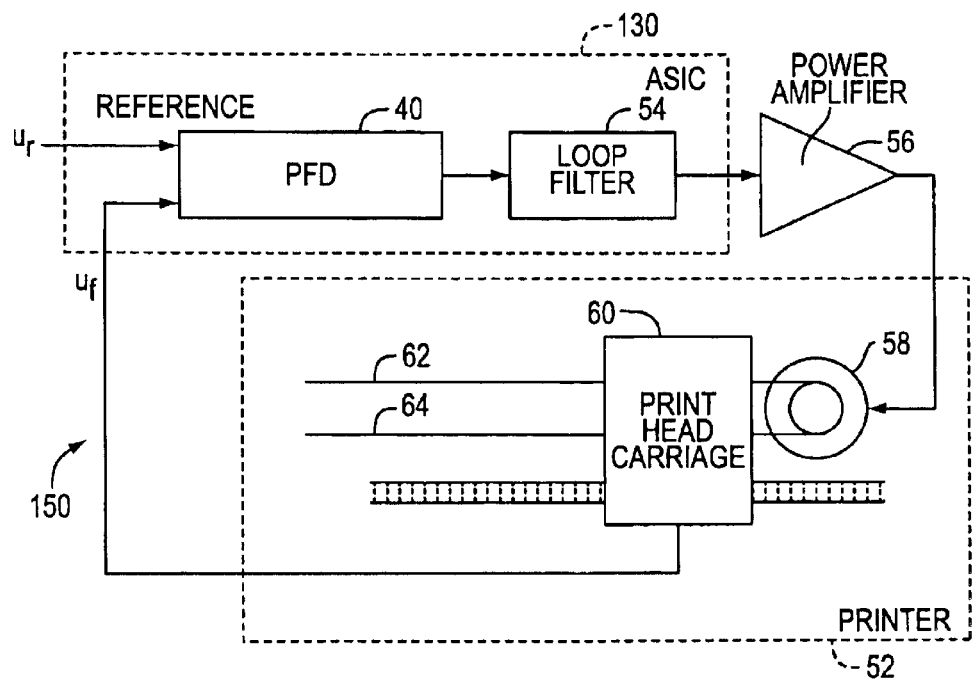
FIG. 23 is a block diagram of an all-digital phase-locked loop ("ADPLL") motor control system according to a preferred embodiment of the present invention.
Figure 24A:
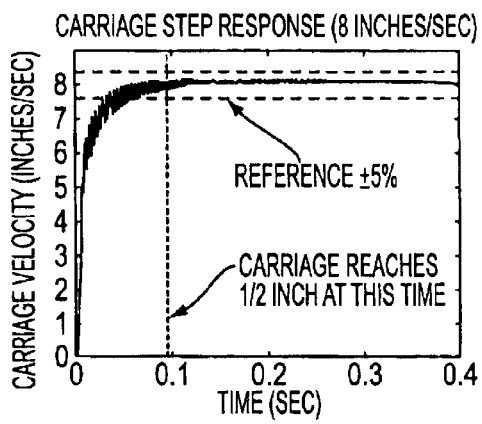
FIGS. 24A–24D respectively illustrate step responses for various print speeds using the ADPLL with optimized parameters.
Figure 24B:
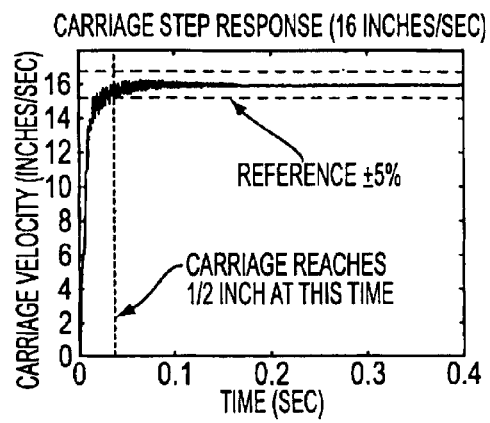
Figure 24C:
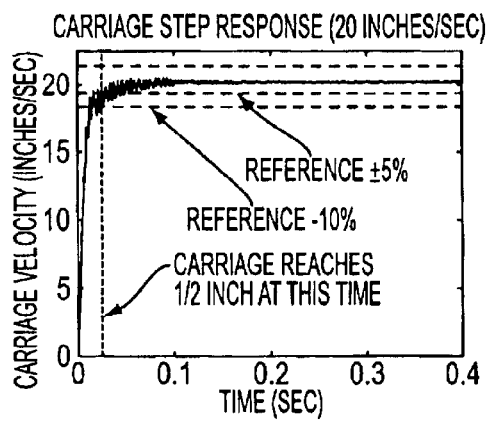
Figure 24D:
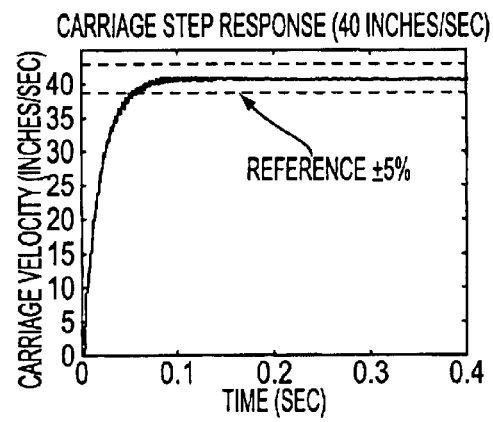

FIG. 23 is a block diagram of an ADPLL motor control system 150 having PFD 40 and loop filter 54 placed into ASIC 130. For convenience, like elements to FIG. 5 are designated with like reference numerals and a detailed description is therefore accordingly omitted. As now particularly illustrated in closed-loop ADPLL motor control system 150, the PFD 40 and loop filter 54 are both all digital devices. The power amplifier 56, which is preferably located on a system board (not shown), will be the only device in the control loop, which is not contained in the ASIC.

Now, the digital loop filter will be optimized. There is no physical constraint that requires the initial count of the two accumulators to be set to zero. Therefore, preloading of the accumulators will allow an increase in system damping without decreasing the initial acceleration profile. By varying the initial preload, the ADPLL design process now contains four variables: i.e., the preloads and frequencies of both accumulators. These parameters may need to be tuned in order to optimize the design. In fact, according to an alternative embodiment of the present invention, an intelligent control system automatically tunes the parameters off-line. Furthermore, during design of the ADPLL, a good starting point can be found by using the methodology presented above to give initial values for the design parameters.

A computer simulation model of the ADPLL is now created using the design set forth above. The system is preferably simulated in the same manner as set forth above with regard to the DPLL system of FIG. 5.

FIGS. 24A–24D illustrate step responses for various print speeds using the ADPLL with the parameters optimized as set forth above. Observe that again all the transient and steady-state specifications are met.

FIG. 25 is a table that provides the values of the design parameters for all four print speeds illustrated in FIGS. 24A–24D. As set forth above, the table of FIG. 25 corresponds to print speeds, which are simulated using a digital computer.

Figure 26:
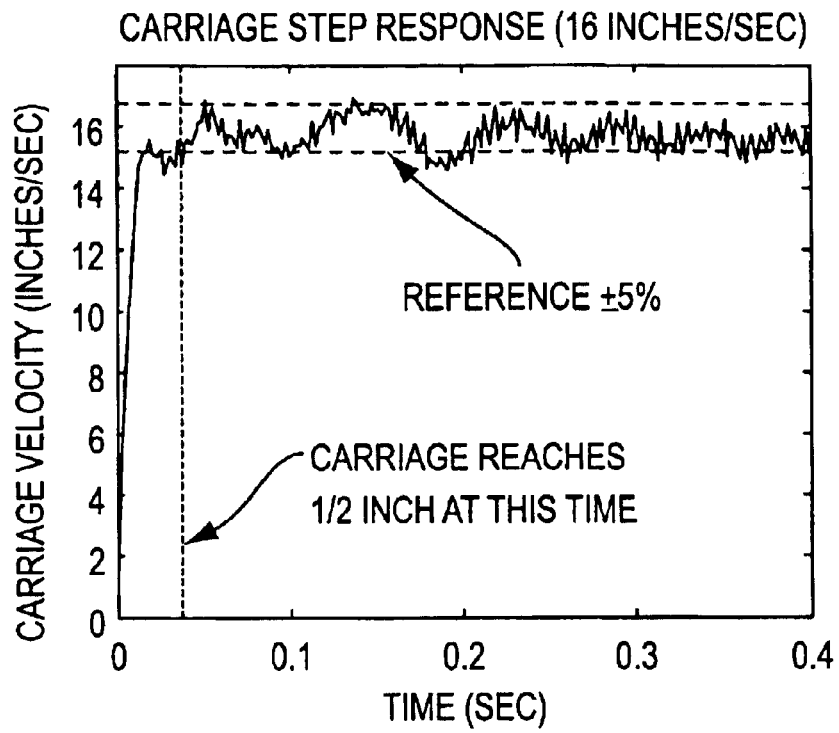
FIG. 26 is a graph of a response of the ADPLL of FIG. 23 having a printing speed of 16 ips.

FIG. 26 is a graph that particularly illustrates the step response of the ADPLL 150 of FIG. 23 having a printing speed of 16 ips. It should be noted that there is still some disturbance in the steady-state mode of operation. Thus, additional damping is preferably added to the controller. Upon reviewing phase detector operation during a step response, unnecessary PFD executions were noticed causing part of the steady-state disturbance. Hence the PFD is preferably redesigned to increase the system damping.

FIG. 27 is a table showing a redesigned PFD state transition table taken in view of the preferred embodiment of system damping. As now particularly illustrated in FIG. 27, two states were added to the transition table in order to decrease the amount of time that the outputs are active. This decreases the amount of time the loop filter will be changing during the look-up process, and thereby provide system damping.

Figure 28:
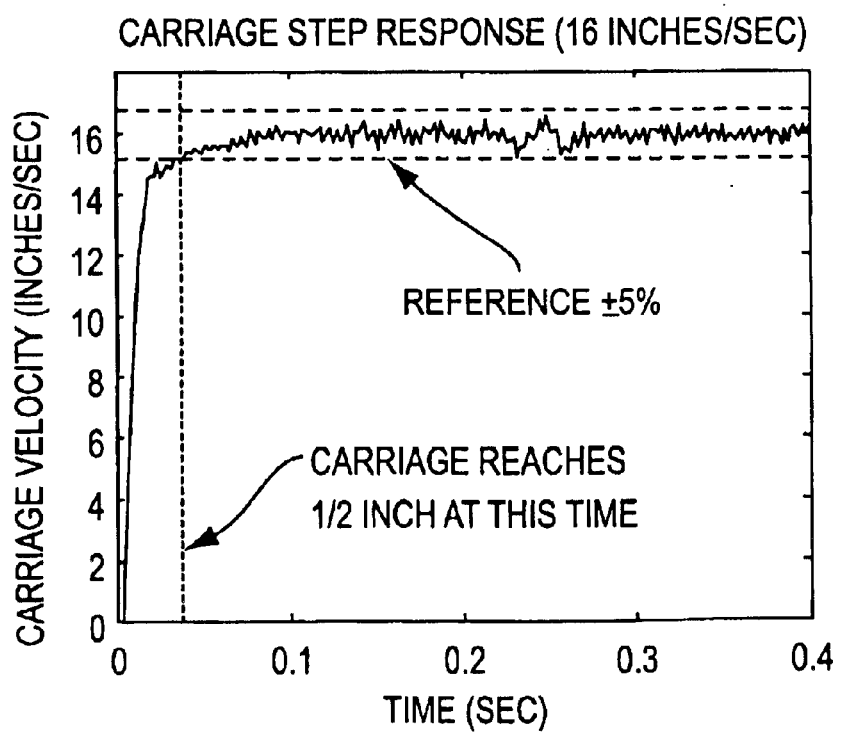
FIG. 28 is a graph of a step response of the ADPLL of FIG. 23 having the state transition table of FIG. 27.

FIG. 28 is a graph that illustrates a step response of an ADPLL with the redesigned PFD state transition table set forth above. As illustrated the transient response and steady-state error are now within preferred specifications.

In summary, the ADPLL has a design process that includes design of a DPLL having an analog loop filter. The analog loop filter 120 is first converted into a digital loop filter using equations (4.7) and (4.8) to find the frequencies of the clocks of the accumulators. Set the preload of accumulator 2 to be close to the steady-state value. In other words, let the system run until steady-state is achieved, and then record the value of the accumulators. Set the preload of accumulator 1 higher than the preload of accumulator 2 set forth above. If the transient response is too slow, increase the preloads. If there is a "ring" in the steady-state response, increase the frequency of the clock of accumulator 1 and decrease the frequency of the clock of accumulator 2. If there is still a "ring" in the steady-state response, use the PFD illustrated in the table of FIG. 27.

As set forth above, because a process of converting an analog loop filter into a digital loop filter has been set forth above, this will allow for the implementation of an ADPLL into an ASIC. Several design parameters for the ADPLL are given. The DPLL system illustrated in FIG. 5 can now be converted from an analog loop filter design into a digital loop filter. Thus, an ADPLL will be created which can be implemented in an ASIC.

The PLL control system has been introduced as a candidate to control the velocity of a motor and in particular the print head carriage system of an inkjet printer. The control system has a phase detector and a loop filter. The print head carriage is belt driven by a DC motor, which will emulate the VCO component of a PLL. For the PLL control system to be advantageous to the particular application of an inkjet, the control system should replace most of the microprocessor operation. Any PLL can be implemented in solid-state or digital hardware apart from the microprocessor. In fact, if the PLL system is implemented into the system ASIC, then virtually no increase in costs would be incurred with the PLL control system.

In the DPLL set forth above, a phase-frequency (PFD) type phase detector was chosen. This phase detector allows the PLL to achieve a lock condition from any initial frequency difference. However in both the frequency and phase domains, the PFD exhibits highly non-linear operation when the PLL is in the unlocked mode of operation. In most PLL applications, there is no problem with the non-linear behavior since the designer is more concerned with whether the PLL will achieve lock-up rather than how the PLL will behave as lockup is achieved. Since the unlocked mode of operation occurs during the transient response as the print head carriage changes velocity, the non-linear behavior of the PFD takes primary consideration.

In order to predict the behavior of the PLL in the unlocked mode of operation, an analysis method was developed to model the non-linear behavior of the PFD. With the reference input of the PFD set to a constant frequency, the frequency of the other input was varied sinusoidally, and the output was observed. From this input/output, a relation of a describing function was calculated in the frequency domain and converted to the time domain. This technique improves on other analysis methods by providing information concerning the degree of stability of the closed-loop PLL system, allowing conventional control techniques to be used to find an appropriate compensator. Once the compensator was designed, the closed-loop system was simulated to verify that all of the design specifications were met.

As mentioned previously, it is believed that no conventional technique exists for the design of digital loop filters. In fact, most ADPLLs are designed using little or no system theory at all. This is perhaps a reason why ADPLLs have not been used as velocity controllers for DC motors. However, an ADPLL controller is clearly advantageous to be used in DC motor control applications, and in particular inkjet print head control applications.

In order to convert a DPLL to an ADPLL, the loop filter was modified from an analog to a digital circuit, which was implemented with standard digital gates. This modification is achieved by emulating the capacitors of the analog loop filter with digital accumulators. The design variables then become the frequency and the preloads of the accumulators. This emulation only approximates the operation of the analog loop filter.

Nonetheless, the digital loop filter has several advantages over the analog loop filter. First, the control parameters may be changed at any time during printing operation, which will allow for an intelligent control method to optimize control parameters. Conventionally, the slow transient response of PLLs is a disadvantage in motor control applications. However, the ability to preload the accumulators will greatly improve speed of the transient response in the ADPLL control systems. Finally, wit the digital loop filter provides a significantly reduced probability of the system dynamics changing with temperature, process, or time.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A control system for controlling movement of a DC motor, comprising:
    a movement detector to detect movement of the DC motor and output a corresponding feedback signal;
    a digital phase detector to compare phase of the feedback signal from said movement detector with phase of a reference signal and output a comparison signal, wherein the digital phase detector follows a describing function to model non-linear components of the reference signal; and
    a digital loop filter to filter noise from the comparison signal for control of the DC motor.

2. The control system according to claim 1, wherein said movement detector further comprises:
    a carriage which is attached to the motor with a belt drive, said carriage moving in response to movement of the motor; and
    a linear optical encoder attached to said carriage and moving therewith, wherein said linear optical encoder outputs the feedback signal in response to movement of the motor.

3. The control system according to claim 1, wherein said digital phase detector and said digital loop filter are disposed within an application specific integrated circuit.

4. The control system according to claim 1, wherein said digital phase detector is a phase frequency detector.

5. The control system according to claim 4, said phase frequency detector comprising:
    a state machine to receive the feedback signal and the reference signal and selectively output a corresponding signal of UP, DOWN, or no signal;
    a first current source to output positive current as the comparison signal in response to the UP signal; and
    a second current source to output negative current as the comparison signal in response to the DOWN signal,
    wherein the comparison signal is a high impedance state of neither positive nor negative current when said state machine selects to output no signal.

6. The control system according to claim 5, wherein said state machine tracks a time varying reference signal and selectively outputs the signal of UP, DOWN, or no signal in response to the tracked time varying reference signal.

7. The control system according to claim 6, wherein said state machine is weighted with states to provide for system damping, such that the amount of time that said digital loop filter changes during comparison by said digital phase detector is minimized.

8. The control system according to claim 4, wherein said phase frequency detector has a memory to track a time varying reference signal and selectively control the comparison signal in response to the time varying reference signal.

9. The control system according to claim 8, wherein said memory has weighted states to provide for system damping, such that the amount of time that said digital loop filter changes during comparison by said digital phase detector is minimized.

10. The control system according to claim 1, wherein said digital phase detector is a phase frequency detector and said digital filter is a digital compensator, wherein said digital compensator has a time varying sample interval which is set by a digital clock.

11. A control system for controlling movement of a DC motor, comprising:
    a movement detector to detect movement of the DC motor including:
        a carriage which is attached to the motor with a belt drive, said carriage moving in response to movement of the motor; and
        an encoder attached to said carnage and moving therewith, wherein the encoder outputs a feedback signal in response to movement of the motor; and an application specific integrated circuit including:
        a digital phase detector to compare phase of the feedback signal from the encoder with phase of a reference signal and output a comparison signal, wherein the digital phase detector models non-linear components of the reference signal; and
        a digital loop filter to filter noise from the comparison signal for control of the DC motor.

12. The control system according to claim 11, wherein said digital phase detector is a phase frequency detector.

13. The control system according to claim 12, wherein said phase frequency detector selectively outputs positive current, negative current, or no current as the comparison signal in response to the reference signal and the feedback signal.

14. The control system according to claim 12, wherein said phase frequency detector tracks a time varying reference signal and selects the comparison signal in response to the tracked time varying reference signal.

15. The control system according to claim 12, wherein said phase frequency detector provides for system damping, such that the amount of time that said digital loop filter changes during comparison by said digital phase detector is minimized.

16. The control system according to claim 12, wherein said phase frequency detector has a memory to track a time varying reference signal and selectively control the comparison signal in response to the time varying reference signal.

17. A control system for controlling velocity of an ink-jet print head in response to a reference signal, comprising:
    a velocity detector to detect velocity of an inkjet print head and output a corresponding feedback signal;
    a digital phase frequency detector to compare phase of the feedback signal from said velocity detector with the reference signal and output a corresponding comparison signal, wherein said digital phase frequency detector follows a describing function;
    a digital loop filter to filter noise from the comparison signal; and
    a motor to control velocity of the inkjet print head in response to the filtered comparison signal.

18. The control system according to claim 17, wherein said digital phase frequency detector and said digital loop filter are disposed within an application specific integrated circuit.

19. The control system according to claim 17, wherein said phase frequency detector selectively outputs positive current, negative current, or no current as the comparison signal in response to the reference signal and the feedback signal.

20. The control system according to claim 17, wherein said phase frequency detector tracks a time varying reference signal and selects the comparison signal in response to the tracked time varying reference signal.

21. The control system according to claim 17, wherein said phase frequency detector provides system damping by anticipating a step response of said motor, such that the amount of time that said digital loop filter changes during comparison by said digital phase detector is minimized.

22. The control system according to claim 17, wherein said phase frequency detector has a memory to track a time varying reference signal and selectively controls the comparison signal in response to the time varying reference signal.

23. A method for controlling velocity of an inkjet print head in response to a reference signal, comprising the steps of:
    detecting a velocity of an inkjet print head and outputting a corresponding feedback signal;
    comparing phase of the feedback signal with phase of the reference signal using a digital phase frequency detector and outputting a corresponding comparison signal, said comparing step following a describing function;
    filtering noise from the comparison signal; and
    controlling velocity of the inkjet print head in response to the filtered comparison signal.

24. The method according to claim 23, wherein said detecting step tracks a time varying reference signal and selects the corresponding comparison signal in response to the tracked time varying reference signal.

25. The method according to claim 23, wherein said detecting step provides damping by anticipating a step response of the inkjet print head, such that the amount of time required by said comparing step is minimized.

26. A control system for controlling velocity of an inkjet print head in a system including a velocity detector to detect inkjet print head velocity and output a corresponding feedback signal, a phase detector to compare phase of the feedback signal with phase of a reference signal and output a corresponding comparison signal, a digital loop filter to filter noise from the comparison signal, and a motor to control velocity of the inkjet print head in response to the filtered comparison signal, said control system produced by operations, comprising:
    modeling the phase detector in a closed loop, phase locked loop configuration with a describing function; and
    dampening the frequency response of the describing function by anticipating a step response of the motor during initial movement.

27. A control system for controlling velocity of an ink-jet print head in response to a reference signal, comprising:
    a velocity detector to detect velocity of the inkjet print head and output a corresponding feedback signal;
    a digital phase frequency detector to compare phase of the feedback signal from said velocity detector with the reference signal and output a corresponding comparison signal;
    a digital loop filter to filter noise from the comparison signal; and
    a motor to control velocity of the inkjet print head in response to the filtered comparison signal, wherein said phase frequency detector provides system damping by anticipating a step response of said motor, such that the amount of time that said digital loop filter changes during comparison by said digital phase detector is minimized.

28. A method for controlling velocity of an inkjet print head in response to a reference signal, comprising the steps of:
    detecting a velocity of the inkjet print head and outputting a corresponding feedback signal;
    comparing phase of the feedback signal with phase of the reference signal using a digital phase frequency detector and outputting a corresponding comparison signal, wherein said detecting step provides damping by anticipating a step response of the inkjet print head such that the amount of time required by said comparing step is minimized;
    filtering noise from the comparison signal; and
    controlling velocity of the inkjet print head in response to the filtered comparison signal.

29. A control system for controlling movement of a DC motor, comprising
    a movement detector to detect movement of the DC motor and output a corresponding feedback signal;
    a digital phase frequency detector to compare phase of the feedback signal from said movement detector with phase of a reference signal and output a comparison signal, wherein the digital phase frequency detector follows a describing function to model non-linear components; and
    a digital loop filter to filter noise from the comparison signal for control of the DC motor, wherein the digital phase frequency detector has a memory with weighted states to provide for system damping, such that the amount of time that said digital loop filter changes during comparison by said digital phase frequency detector is minimized.

30. A control system for controlling movement of a DC motor, comprising:

a movement detector to detect movement of the DC motor and output a corresponding feedback signal;

a digital phase detector to compare phase of the feedback signal from said movement detector with phase of a reference signal and output a comparison signal, wherein the digital phase detector follows a describing function; and a digital loop filter to filter noise from the comparison signal for control of the DC motor.

* * * * *